US007299322B2

(12) United States Patent
Hosouchi et al.

(10) Patent No.: US 7,299,322 B2
(45) Date of Patent: Nov. 20, 2007

(54) COMPUTER SYSTEM, STORAGE DEVICE AND METHOD PROVIDING INTRA-STORAGE VOLUME IDENTIFIERS CORRESPONDING TO INTRA-HOST VOLUME IDENTIFIERS THROUGH VOLUME SWITCHING COMMANDS

(75) Inventors: Masaaki Hosouchi, Kanagawa (JP);
Kenichi Oyamada, Kanagawa (JP);
Naoko Ikegaya, Kanagawa (JP);
Nobuhiro Maki, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 296 days.

(21) Appl. No.: 11/167,433

(22) Filed: Jun. 28, 2005

(65) Prior Publication Data
US 2006/0248304 A1 Nov. 2, 2006

(30) Foreign Application Priority Data
May 2, 2005 (JP) ............................. 2005-133914

(51) Int. Cl.
*G06F 13/00* (2006.01)
(52) U.S. Cl. .................. 711/154; 711/162; 711/165; 711/111; 711/203; 714/6; 714/7
(58) Field of Classification Search ................ 711/161, 711/162, 164, 165, 170, 111, 204, 154; 714/6, 714/7; 707/204, 205; 709/219
See application file for complete search history.

(56) References Cited

U.S. PATENT DOCUMENTS

| | | | | |
|---|---|---|---|---|
| 6,981,115 | B2* | 12/2005 | Yamagami et al. | 711/162 |
| 7,035,883 | B2* | 4/2006 | Kezuka et al. | 707/205 |
| 7,047,360 | B2* | 5/2006 | Soejima et al. | 711/114 |
| 7,185,164 | B2* | 2/2007 | Kusama et al. | 711/170 |
| 2004/0123180 | A1* | 6/2004 | Soejima et al. | 714/5 |
| 2005/0097145 | A1* | 5/2005 | Benhase et al. | 707/200 |
| 2007/0033437 | A1* | 2/2007 | Kawamura et al. | 714/20 |

FOREIGN PATENT DOCUMENTS

JP 11-327986 11/1999

* cited by examiner

*Primary Examiner*—Hong Kim
(74) *Attorney, Agent, or Firm*—Mattingly, Stanger, Malur & Brundidge, P.C.

(57) ABSTRACT

Related plural logical volumes can be used after switching over from the host computer therein. A switching command, which a host computer sends, makes a storage device search for a switching target volume, from the volume tables, that is identical to identification information of the switching target volume received among switching target candidate volumes that form a volume pair relation with the switching source volume. The storage device memorizes an intra-host ID of the switching target volume and an intra-storage ID of the switching target volume in a switching table with a correspondence there between. The storage device acquires the intra-storage ID of the switching target volume in reference to the switching table in the case of receiving an access request, such that the intra-host ID of the switching source volume is used as a key, and executes switching to access to the switching target volume.

17 Claims, 19 Drawing Sheets

FIG.2

| Primary Storage Device ID (211) | Primary Volume ID (212) | Secondary Storage Device ID (221) | Secondary Volume ID (222) | Group ID (201) | Pair Status (202) | Copy Type (203) |
|---|---|---|---|---|---|---|
| 11111 | 11 | 11111 | 12 | LG1 | SUSPEND | Local |
| 11111 | 11 | 22222 | 21 | RG1 | DUPLEX | Remote |

200 Volum Pair Control Table

FIG.3

| Group ID (301) | Copy Type (302) | Suspend Time (303) |
|---|---|---|
| LG1 | Local | 00:00:00 |
| RG1 | Remote | 00:00:00 |

300 Group Control Table

FIG.4

| Volume ID (401) | Switching Target Primary Storage Device ID (402) | Switching Target Volume ID (403) | Relay Primary Storage Device ID (404) | Relay Volume ID (405) |
|---|---|---|---|---|
| 11 | 22222 | 21 | 22222 | 21 |
| 11 | 22222 | 21 | 22222 | 21 |

400 I/O Target Control Table

FIG.5

| Device Number (501) | Sub-Channel ID (502) |
|---|---|
| D011 | C011 |
| : | : |

500 Device Control Table

FIG.6

| Sub-Channel ID (601) | I/O Issuing Target Port ID (602) | I/O Issuing Target CHA ID (603) | I/O Issuing Target Volume ID (604) |
|---|---|---|---|
| C011 | 01 | 01 | 11 |
| : | : | : | : |

600 Channel Path Control Table

FIG.7

| Computer ID (701) | I/O Issuing Target Port ID (702) | I/O Issuing Target CHA ID (703) | I/O Issuing Target Volume ID (704) | Request Code (705) |
|---|---|---|---|---|
| Switching Data (I/O Data / I/O Target Switching Request Data) (706) ||||||

700 Transfer Data Structure

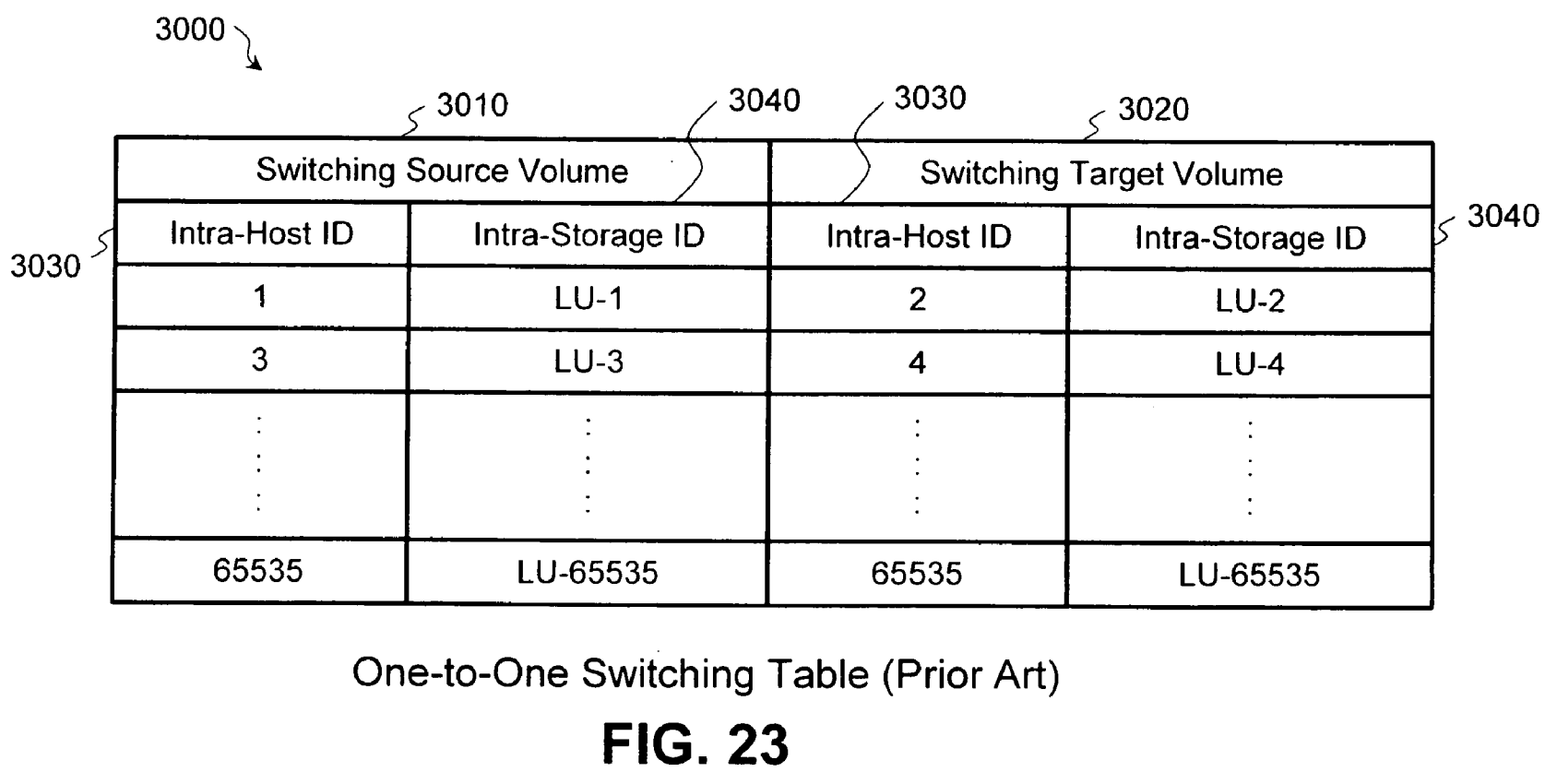

| Switching Source Volume | | Switching Target Volume | |
|---|---|---|---|
| Intra-Host ID | Intra-Storage ID | Intra-Host ID | Intra-Storage ID |
| 1 | LU-1 | 2 | LU-2 |
| 3 | LU-3 | 4 | LU-4 |
| ...... | ...... | ...... | ...... |
| 65535 | LU-65535 | 65535 | LU-65535 |

One-to-One Switching Table (Prior Art)

FIG. 23

| Switching Source Volume | Switching Target Volume 1 | Switching Target Volume 2 | Switching Target Volume 3 | |
|---|---|---|---|---|
| Intra-Host ID | Intra-Storage ID | Intra-Storage ID | Intra-Storage ID | |
| 1 | LU-A1 | LU-B1 | LU-C1 | ⋮ |
| 2 | LU-A2 | LU-B2 | LU-C2 | ⋮ |
| 3 | LU-A3 | LU-B3 | LU-C3 | ⋮ |
| ⋮ | ⋮ | ⋮ | ⋮ | ⋮ |
| 65535 | LU-A65535 | LU-B65535 | LU-C65535 | ⋮ |

One-to-Many Switching Table

FIG. 24

COMPUTER SYSTEM, STORAGE DEVICE AND METHOD PROVIDING INTRA-STORAGE VOLUME IDENTIFIERS CORRESPONDING TO INTRA-HOST VOLUME IDENTIFIERS THROUGH VOLUME SWITCHING COMMANDS

BACKGROUND

The present invention relates to a computing system, a host computer, storage device used in the computing system and a volume switching method employed in the computing system.

To reduce the risk of data losses in a storage device due to accidents or failures, a technique called "host-free copy" is applied. This technique enables data of a storage device to be copied within the device itself or to another storage device without the mediation of a host computer. The data to be copied are handled in a unit of a storage area called a "logical volume" or "volume". This logical volume is a logically separated area in the storage devices.

When a script or an application determines an area to which a file is allocated, a host computer needs a host identifier (host ID). This host ID is used to identify a logical volume uniquely by a host computer. A host ID differs from an intra-storage ID used to allow a storage device to identify a logical volume therein. In addition, the host ID and the intra-storage ID are related to each other in a pre-setting process called "storage device generation".

The Host IDs typically correspond to intra-storage IDs in a one-to-one relation. However, a technique in which use of a single host ID enables the access to multiple logical volumes is disclosed in Japanese Unexamined Patent Application Publication No. 11-327986. In this technique, a host computer switches a relation between a logical volume and a host ID. Specifically, when an application issues an input/output (I/O) request, a host ID related to a certain logical volume makes it possible to access another logical volume to which another host ID is related.

It is sometimes difficult to make host IDs corresponding to intra-storage IDs in a one-to-one relation. This may occur when the number of allocatable host IDs is different from that of allocatable intra-storage IDs. The number of allocatable IDs is defined by the capacity of an address area, and this capacity is typically determined by a standard specification or something similar. In other words, if a host computer and a storage device are consistent to a certain standard specification, an address area of a predetermined capacity is used in accordance with the specification. This means that the number of their allocable IDs is limited by the specification.

As for a host computer, it uses a host ID in accordance with a standard specification in order to access various storage devices produced by individual venders. In contrast, a storage device uses an intra-storage ID in accordance with a specification defined arbitrarily by venders. This is because the intra-storage ID is used only for internal processing of the storage device.

Accordingly, a host ID in compliance with a standard specification confines an address area to a small capacity, and an intra-storage ID in accordance to an arbitrary specification enables an address area of a large capacity to be used. As a result, their capacities differ from each other. In other words, owing to the number of allocatable hosts ID, a host computer cannot access the whole storage areas of a storage device, thereby inhibiting the maximum use of the storage areas within the storage device.

Conventionally, host IDs for accessing a storage device are allocated to volumes of a storage device in a one-to-one relation. It is assumed that a host computer A uses a certain volume in order to execute a specific application and the copy of this volume is used by a host computer B for back-up or test use. In this case, upon a failure in the host computer A, the host computer B can inherit the operation of the host computer A by employing the technique disclosed in the above publication No. 11-327986. However, in order to achieve this operation, the host computer B needs to allocate a host ID beforehand not only to the target (copied) volume but also the source volume. In addition, when a target volume is already present, it is necessary to allocate a host ID to the target volume. This is because the host computer is necessary to access the target volume promptly, if a failure occurs in the source volume or if consistency is lacking between the source and target volumes.

SUMMARY OF THE INVENTION

Taking the above disadvantages into account, the present invention has been conceived. An object of the present invention is to provide a technique which enables a single host ID to be related to multiple logical volumes by allowing a host computer to switch these multiple volumes.

According to an aspect of the present invention, in order to realize the purpose as described above, the present invention provides a storage device used for a computing system that includes a host computer identifying a volume thereof with an intra-host ID and the storage device that identifies the volume thereof with an intra-storage ID which comprises: 1) a volume pair control table to control volume pairs that execute copy among plural volumes, 2) an I/O receiving process unit to receive a switching command, from the host computer that makes correspondence between the intra-host ID of a switching target volume and identification information of a switching source volume, 3) an I/O target search process unit to search the switching target volume, from the volume tables, that is identical to identification information of the switching target volume receipt among switching target candidate volumes that form the volume pair relation with the switching source volume, 4) an I/O target memory process unit to memorize the intra-host ID of the switching target volume and the intra-storage ID of the switching target volume after being searched in a switching table with a correspondence therebetween, and 5) an I/O processing unit to acquire the intra-storage ID of the switching target volume in reference to the switching table in case of receiving access request, such that the intra-host ID of the switching source volume is a key, and execute switching to access to the switching target volume.

Other aspects, features and advantages of the present invention will become apparent upon reading the following specification and claims when taken in conjunction with the accompanying drawings.

BRIEF DESCRIPTION OF THE DRAWINGS

For more complete understanding of the present invention and the advantages thereof, reference is now made to the following description taken in conjunction with the accompanying drawings wherein:

FIG. 2 is a schematic that explains a structure of a volume pair control table regarding an embodiment of the present invention.

FIG. 3 is a schematic that explains a structure of a group control table regarding an embodiment of the present invention.

FIG. 4 is a schematic that explains a structure of an input-output correspondence control table regarding an embodiment of the present invention.

FIG. 5 is a schematic that explains a structure of a device control table regarding an embodiment of the present invention.

FIG. 6 is a schematic that explains a structure of a channel path control table regarding an embodiment of the present invention.

FIG. 7 is a schematic that explains a structure of a transfer data control table, which the host computer sends to the storage device, regarding an embodiment of the present invention.

FIG. 23 illustrates a one-to-one switching table that is generated by defining a volume pair of a switching source volume and a switching target volume in a scheme that makes a one-to-one relation between an intra-host ID and an intra-storage ID.

FIG. 24 illustrates a one-to-many switching table that is generated in an embodiment of the present invention.

DETAILED DESCRIPTION OF THE EXEMPLARY EMBODIMENTS OF THE INVENTION

Figure 1:
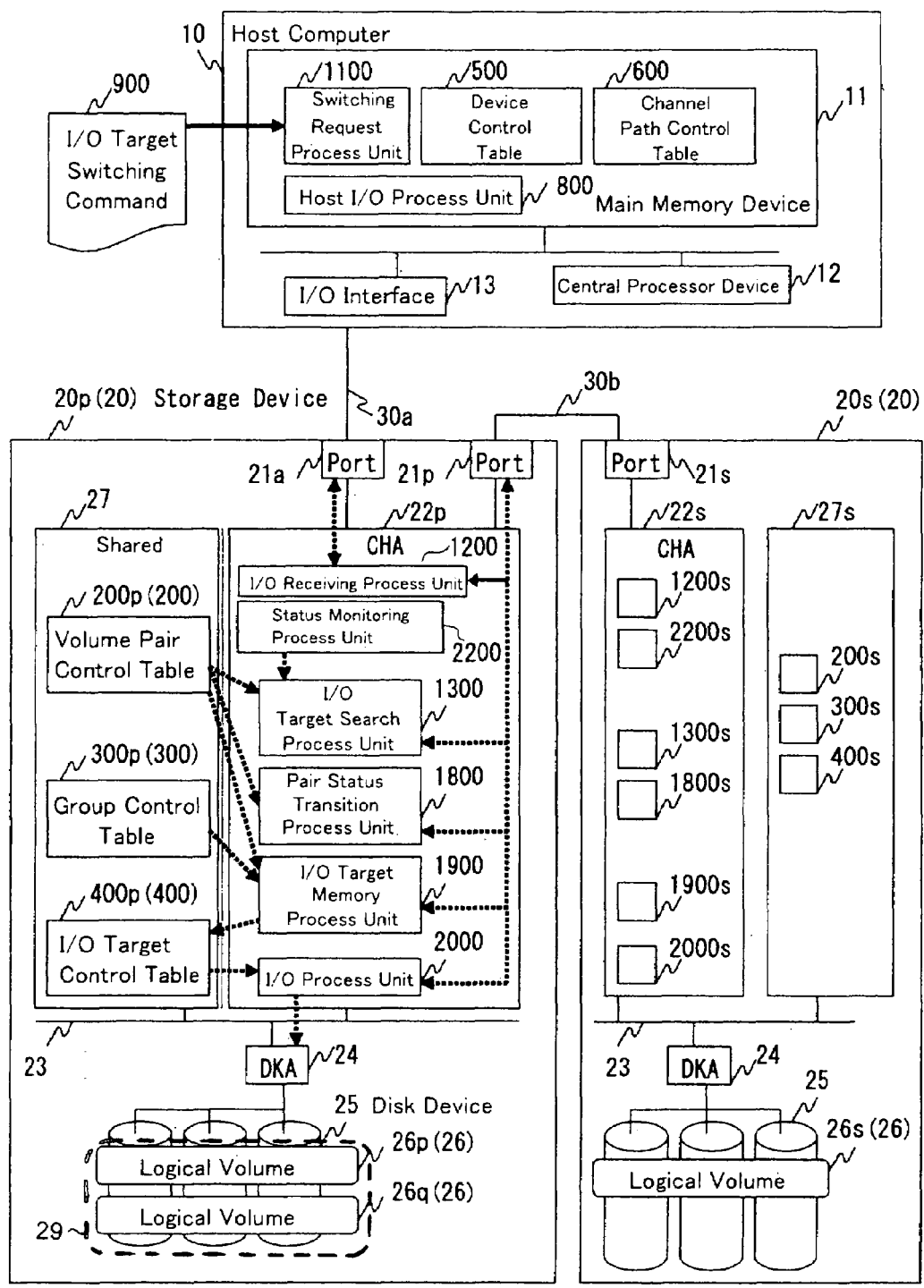
FIG. 1 is a schematic that shows an example of a hardware structure regarding an embodiment of the present invention.

A detailed description will be given below, of a computing system according to one embodiment of the present invention. Referring to FIG. 1, a computing system includes a host computer 10 composed of a main memory 11, a central processing unit (CPU) 12, and an I/O interface 13 such as a host channel adaptor. The I/O interface 13 is connected to the CPU 12 via an internal bus.

A storage device 20 is connected to the I/O interface 13 through a network 30a. We have defined that the storage device 20 corresponds to any of storage devices 20p and 20s and we will use these assigned numbers to appropriately denote the systems and devices. The network 30a includes an optical cable, a switch and the like.

The storage device 20 is constituted as follows;
(1) a port 21, such as port 21a, 21p or 21s, that serves as an interface to Fibre Channel, SCSI and the like,
(2) a channel adapter (CHA) 22, such as a channel adapter 22p or 22s, that controls the port 21,
(3) a disk device 25, such as a disk device 25p or 25s, that is a hardware having a physical memory area,
(4) a disk adapter (DKA) 24, such as a disk adapter 24p or 24s, that controls the input/output of the disk device 25,
(5) a bus and switch 23, such as a bus and switch 23p or 23s, that both constitute a data communication path between the port 21 and the disk device 25, and
(6) a shared memory 27, such as a shared memory 27p or 27s, that is a memory accessible from the CHA 22 and the DKA 24.

Note that the number of each component is not limited to one, and it may be a plurality.

The host computer 10 uses the memory area of the disk device 25 and manages it, as a unit of logically separated area. The volume 26 corresponds to the logically separated area. The physical location of the volume in the disk device 25 is stored in the shared memory 27. In the configuration of FIG. 1, only the logical volume 26p contains a device number, and other volumes contain no numbers.

The storage device 20 identifies the volume 26 by using a volume ID, while the host computer 10 identifies it by using the device number. Herein, the volume ID and the device number refer to an intra-storage ID and a host ID, respectively. The data length of the device number may be shorter than that of the volume ID. Specifically, since the host computer 10 manages the storage device in accordance with a specific standard specification, the capacity of the address area, which can be allocated as a device number, is limited by the specification. For example, the number of bytes of the address area is 2. On the other hand, the storage device 20 manages the device itself in accordance with an original specification and, therefore the capacity of the address area of the volume ID can arbitrarily be defined. For example, the number of bytes of the address area is 4. In this case, the memory capacity in which host computer 10 manages the device number is different from that in which the storage device 20 manages the volume ID.

The host computer 10 includes a device control table 500 and a channel path control table 600. Both these tables store information on the relationships between the device number and an I/O path or the volume ID of a target to which an I/O request is to be issued, when the host computer 10 is set up. When an I/O process is executed, the main memory 11 determines an I/O path with reference to the table 500 or 600, and then issues an I/O request to a source volume through the determined path.

The switching request process unit 1100 enables the access to the multiple volumes by using a single device number. Specifically, it switches the corresponding relation between the device number and the volume in response to the input of an I/O target switching command 900. The host I/O process unit 800 generates a transfer data structure 700 (illustrated in FIG. 7) by determining one of the I/O path and the volume that are related to the device number, and then transfers the transfer data structure 700 to the storage device 20 through the network 30a.

Figure 10:
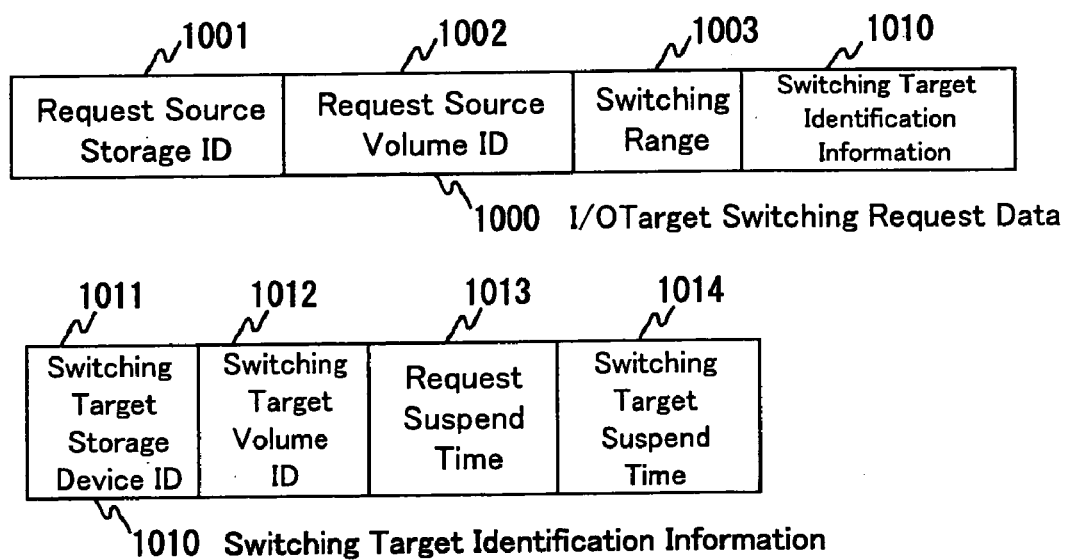
FIG. 10 is a schematic that explains a structure of switching request data.

The switching request process unit 1100 generates I/O target switching request data 1000 (illustrated in FIG. 10). An I/O target volume search process unit 1300, a pair status transition process unit 1800, and an I/O target memory process unit 1900 refers to the I/O target switching request data 1000 contained in the transfer data structure 700 and, then determines a switching target volume while communicating with another storage device 20, so that the information on the target volume is stored in an I/O target control table 400 within the shared memory 27. Note that the I/O target control table 400 refers to a switching table, described hereinafter.

An I/O process unit 2000 requests the input/output of the volume 26 to which the device number is related, and which is designated by the I/O target control table 400. A status monitoring process unit 2200 monitors the pair status and activates an I/O receiving process unit 1200 without the request from the host computer 10.

This embodiment executes the following specific processing:
(1) the switching request process unit 1100 and the status monitoring process unit 2200 issue a request to the storage device 20,
(2) the storage device 20 refers to the volume pair control table 200 (also called volume table, herein), which manages a volume pair generated by the host-free copy, and the group control table 300, in accordance with the request,
(3) when the volume is ready to create a pair, the storage device 20 allows the volume or a group to which the volumes belong be a single unit, and
(4) the storage device 20 changes the target volumes to which an I/O request is issued.

The old target is a volume to which the device number is related, and the new target is a partner volume, a volume making a pair with the partner volume, or a volume that used to create a pair. The new target is not related to the device number, and is located in the storage device 20 or another storage device.

Herein, the host-free copy includes a remote copy and local copy performed by the storage device 20. By performing the remote copy, a secondary volume 26s, which is located in the storage device 20p connected to the host computer 10, is generated in the disk device 25s in the storage device 20s without the mediation of the host computer 10. The storage device 20s may not be connected to the host computer 10 directly, as long as it is connected to the storage device 20p. In this case, the logical volume 26s is the secondary volume of the logical volume 26p that is generated by the remote copy.

The primary volume 26p, which is a source, is denoted by the primary volume, and the secondary volume 26s, which is a target, is denoted by the secondary volume. A pair of the first and the second volumes is represented by a volume pair. The volume pair is aimed at maintaining the consistency between the primary and secondary volumes and controlling it. Alternatively, multiple volumes may create a group.

The local copy is such that the secondary volume 26q, which is located in the disk device 25, is copied to the same device, that is, the disk device 25 itself, without the mediation of the host computer 10. Similar to the remote copy, a pair of the primary volume 26p (source) and secondary volume 26q (target) is denoted by a volume pair 29. The volume pair 29 may be a group composed of multiple volumes. Note that the logical volume 26q is the secondary volume of the logical volume 26p which is generated by the local copy.

As shown in the following descriptions (a) to (c), in the volume pair, the primary volume or the secondary volume of a pair A can have the same structure as the primary volume or the secondary volume of a pair B. As the volume included in the volume pair A or B, a group of the same volumes of which source volume is the same is called "copy volume group".

(a) A secondary volume of a volume pair which is generated by a remote copy has the same structure as that of a primary volume of a different volume pair which is generated by a remote copy.

(b) A primary volume of a volume pair which is generated by a remote or local copy has the same structure as that of a primary volume of a different volume pair which is generated by a remote copy or a local copy.

(c) A primary or secondary volume of a volume pair which is generated by a remote copy has the same structure as that of a primary volume of a different volume pair which is generated by a local copy.

Referring to tables of FIGS. 2 to 4, the values of each table are extracted from the following table, but these values are merely examples.

TABLE 1

| ITEM | VALUE |
| --- | --- |
| Device number of logic volume 26p | D011 |
| Sub-channel number of device number D011 | C011 |
| Port number of logic volume 26p | 01 |
| CHAID of logic volume 26p | 01 |
| Volume ID of logic volume 26p | 11 |
| System ID of storage device 20p which logic volume 26p belongs to | 11111 |
| volume ID of logic volume 26q | 12 |
| System ID of storage device 20s which logic volume 26s belongs to | 22222 |
| Volume ID of logic volume 26s | 21 |
| Group ID generated by local-copy | LG1 |
| Group ID generated by remote-copy | RG1 |

Referring to FIG. 2, the entry described for each volume pair in a volume pair control table 200 contains information including;
(1) a primary storage device ID 211, such as a serial number, for identifying the primary storage device 20p uniquely to which the primary volume 26p belongs,
(2) a primary volume ID 212 for identifying the primary volume 26p uniquely in the storage device 20p,
(3) a secondary storage device ID 221 for identifying the storage device 20s uniquely to which the secondary volume 26s belongs,
(4) a secondary volume ID 222 for identifying the secondary volume 26s uniquely in the storage device 20s,
(5) a group ID 201 of a group to which volumes (secondary volume upon local copy) in the storage device belong, for identifying multiple pairs each of which is composed of the same primary volume and a different secondary volume, (6) a pair status 202, and (7) a copy type 203 designating the type of the host-free copy such as local or remote copy.

In this case, the pair status 202 indicates the following statuses to identify the consistent status of the volume pairs and the transfer status of the differential data.

TABLE 2

| PAIR STATUS | DESCRIPTION |
| --- | --- |
| SIMPLEX | Status that the pair has not been established or status that the pair has been deleted |
| PENDING | Status that the pair is created and data transfer starts between primary and secondary volumes, but data in volume is not consistent |
| DUPLEX | Status that the data transfer from primary to secondary volumes is completed, and updated data is transferred from primary to secondary volumes is completed, and updated data is transferred |
| SUSPEND | Status that the data transfer is suspended |
| DUPLEX-ERR | Status that failure occurs in DUPLEX OR PENDING status |
| SUSPEND-ERR | Status that the failure occurs in SUSPEND status |

In the volume pair control table 200, the entry that has not been allocated is written or the entry of SIMPLEX status is overwritten, upon reception of a pair establish request. To delete the pair, the entry may be deleted. Alternatively, the status may be changed to SIMPLEX status. In this case, since the volume ID or the storage device ID required for the switching process is left, it can be allocated to the volume 26 that is a previous partner.

Referring to FIG. 3, an entry described for each group in a group control table 300 includes a group ID, a copy type that is common to all volume pairs in the group, and a suspend time 303 indicating when a volume pair of a volume belonging to the group is lastly suspended.

Referring to FIG. 4, an entry described for each volume 26 to which a switching request is issued in the I/O target control table 400 is constituted as follows;

(1) a volume ID 401 of the primary volume 26p, (2) a switched target primary storage device ID 402 of a storage device to which a storage device, to which a volume belongs, is switched, (3) a switched target volume ID 403 of a volume to which the volume 26 of an I/O target is switched, (4) a relay primary storage device ID 404 of a storage device to which a storage device to which a volume belongs is relayed, and (5) a relay volume ID 405 of the volume 26, which is a relay target for transferring the transfer data structure 700 when the I/O target volume and the I/O issuing target volume are contained in different storage devices, respectively.

In this case, the switched target is the volume 26s.

In a device control table 500 of FIG. 5, an entry is described for each volume 26 accessible from the host computer 10 among the volumes 26 in each storage device 20. The entry contains a device number 501 and sub-channel ID 502.

In the channel path control table 600 of FIG. 6, an entry is described for each sub-channel ID. The entry includes a sub-channel ID 601, an I/O issuing target port ID 602 indicating the port 21 of an I/O issuing target, an I/O issuing target CHA ID 603 of the adaptor 22 which is an I/O issuing target, and an I/O issuing target volume ID 604 of the primary volume 26p.

Referring to FIG. 7, a transfer data structure 700 has the structure including;

(1) a computer ID 701 of the host computer 10 which has issued an I/O request, (2) an I/O issuing target port ID 702 of the port 21 through which an I/O request is to be issued, (3) an I/O issuing target CHA ID 703 of the adaptor 22 to which an I/O request is to be issued, (4) an I/O issuing target volume ID 704 of the primary volume 26p to which an I/O request is to be issued, (5) a request code 705 for interpreting the request for the volume 26, such as an input or output request, and (6) switching data 706 to be outputted to the volume 26.

Figure 8:
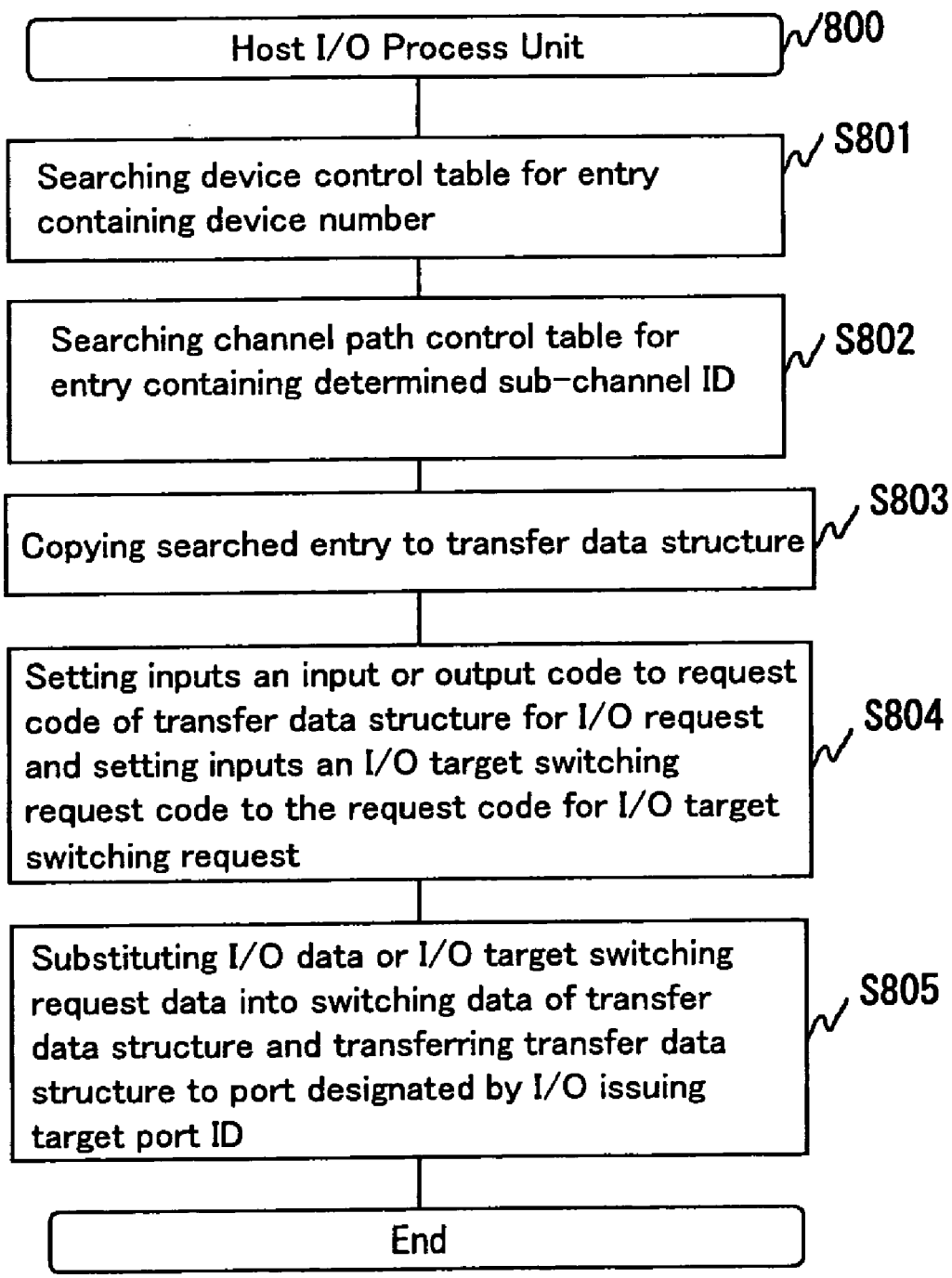
FIG. 8 is a flow chart that shows an input and output process regarding an embodiment of the present invention.

Referring to FIG. 8, the host I/O process unit 800 first searches the device control table 500 for an entry containing the device number 501 (S801) and then identifies sub-channel ID502 contained in the entry searched in S801. Subsequently, the host I/O process unit 800 searches the channel path control table 600 for an entry containing the determined sub-channel ID502 (S802).

The host I/O process unit 800 copies the entry searched in S802 to the transfer data structure 700 (S803). Specifically, the I/O issuing target port ID 602, the I/O issuing target CHA ID 603 and the I/O issuing target volume ID 604 in the searched entry is copied to the I/O issuing target port ID 702, the I/O issuing target CHA ID 703 and the I/O issuing target volume ID 704, respectively.

Upon sending of the I/O request, the host I/O process unit 800 inputs an input or output code to the request code 705 of the transfer data structure 700. Alternatively, upon sending of the I/O target switching request, the host I/O process unit 800 inputs an I/O target switching request code to the request code 705 (S804).

The host I/O process unit 800 substitutes an I/O data or an I/O target switching request data into the switching data 706 of the transfer data structure 700. Subsequently, the host I/O process unit 800 transfers the transfer data structure 700 to a port designated by the I/O issuing target port ID 702 (S805).

In this case, if the primary volume 26p to which the device number is related needs to be switched to a volume to which it is not related (for example, the volume 26q or 26s), then an I/O target switching command is input to the host computer 10 through a user or an application or script of the host computer 10.

Figure 9:
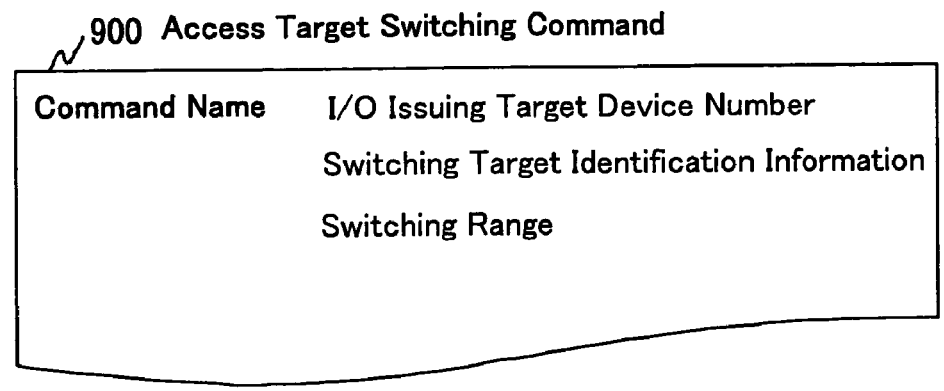
FIG. 9 is a schematic that explains computer grammar of an I/O target switching command regarding an embodiment of the present invention.

Referring to FIG. 9, an operand of the access target switching command 900 contains, as minimum contents, the device number of the primary volume 26p, and switched target identification information 1010 (see FIG. 10). The operand may further contain a switching area for indicating only the volume designated by the switched target identification information 1010, or for indicating all the volumes in the group to which the designated volume belongs.

The switched target identification information 1010 is information for identifying a volume to which a current volume is to be switched, in order to send the I/O request to the I/O issuing target volume. This information designates at least one of a pair of a switched target volume ID 1012 and a switched target storage device ID 1011 or a request suspend time 1013.

Referring to FIG. 10, the I/O target switching request data 1000 contains a request source storage device ID 1001, a request source volume ID 1002, a switched area 1003, and a switched target identification information 1010. In this case, the switched area 1003 shows whether the area to be switched is a volume or a group.

Switched target identification information 1010 contains:
(a) a switched target storage device ID 1011,
(b) a switched target volume ID 1012 to which a value is input when the volume ID is designated to the I/O target switching command 900,
(c) a request suspend time 1013 to which a value is input when suspend time is requested, and
(d) a switched target suspend time 1014 determined so as to be close to the request suspend time 1013.

As for the request source storage device ID 1001, the value is not determined when the I/O target switching request data 1000 is sent from the host computer 10 to the primary storage device 20p. However, its value contains a logical volume ID of the primary storage device 20p when the I/O target switching request data 1000 is sent from the primary storage device 20p to the secondary storage device 20q.

First, a description will be given below, of a process in which use of the access target switching command 900 of FIG. 7 allows the entry of the switched target identification information 1010 to be registered in the volume pair control table 200, with reference to FIGS. 11 to 19. Next, a description will be given below, of a process for switching an access to a volume appropriately, with reference to FIGS. 20 to 22.

Figure 11:
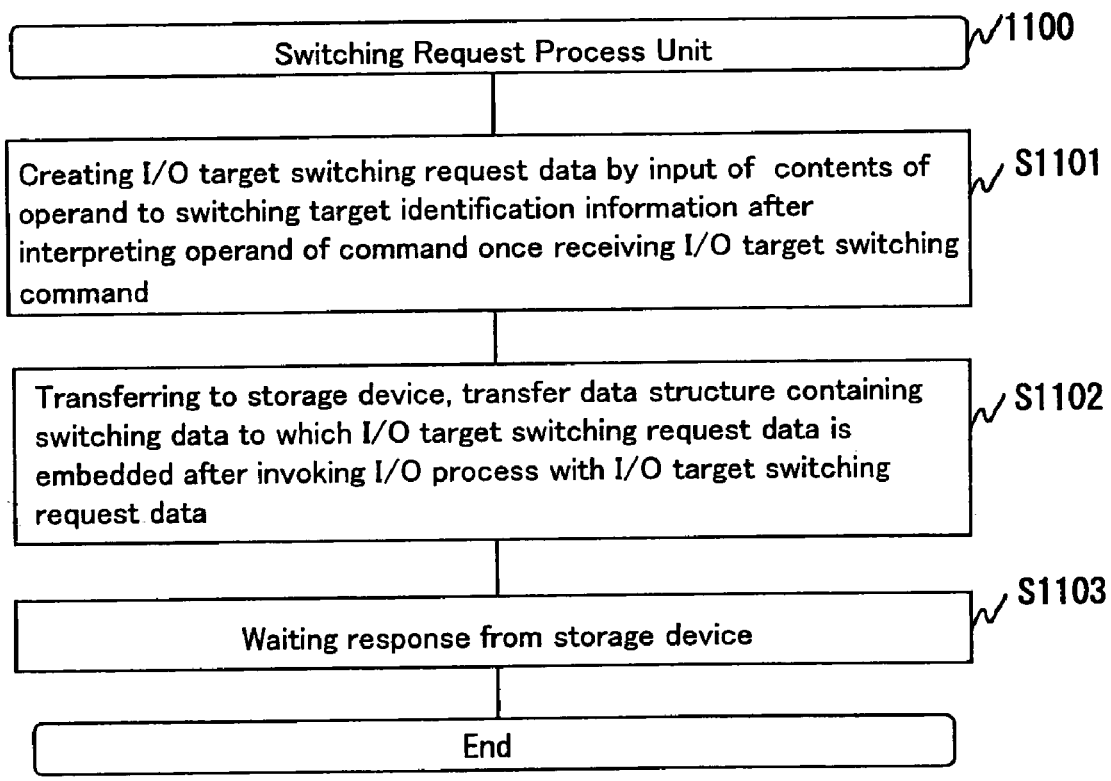
FIG. 11 is a flow chart that shows a switching request process regarding an embodiment of the present invention.

In a flow chart of FIG. 11, once receiving the I/O target switching command 900, the switching request process unit 1100 interprets the operand of the command and then creates the I/O target switching request data 1000 by the input of the contents of the operand to the switching target identification information 1010 (S1101).

The switching request process unit 1100 invokes an I/O process with the I/O target switching request data 1000. Subsequently, a switching request process unit 1100 (not shown in FIG. 11) transfers, to the storage device 20, the transfer data structure 700 containing the switching data 706 to which the I/O target switching request data 1000 is embedded (S1102). Then, switching request process unit 1100 waits for a response from the storage device 20 (S1103).

Figure 12:
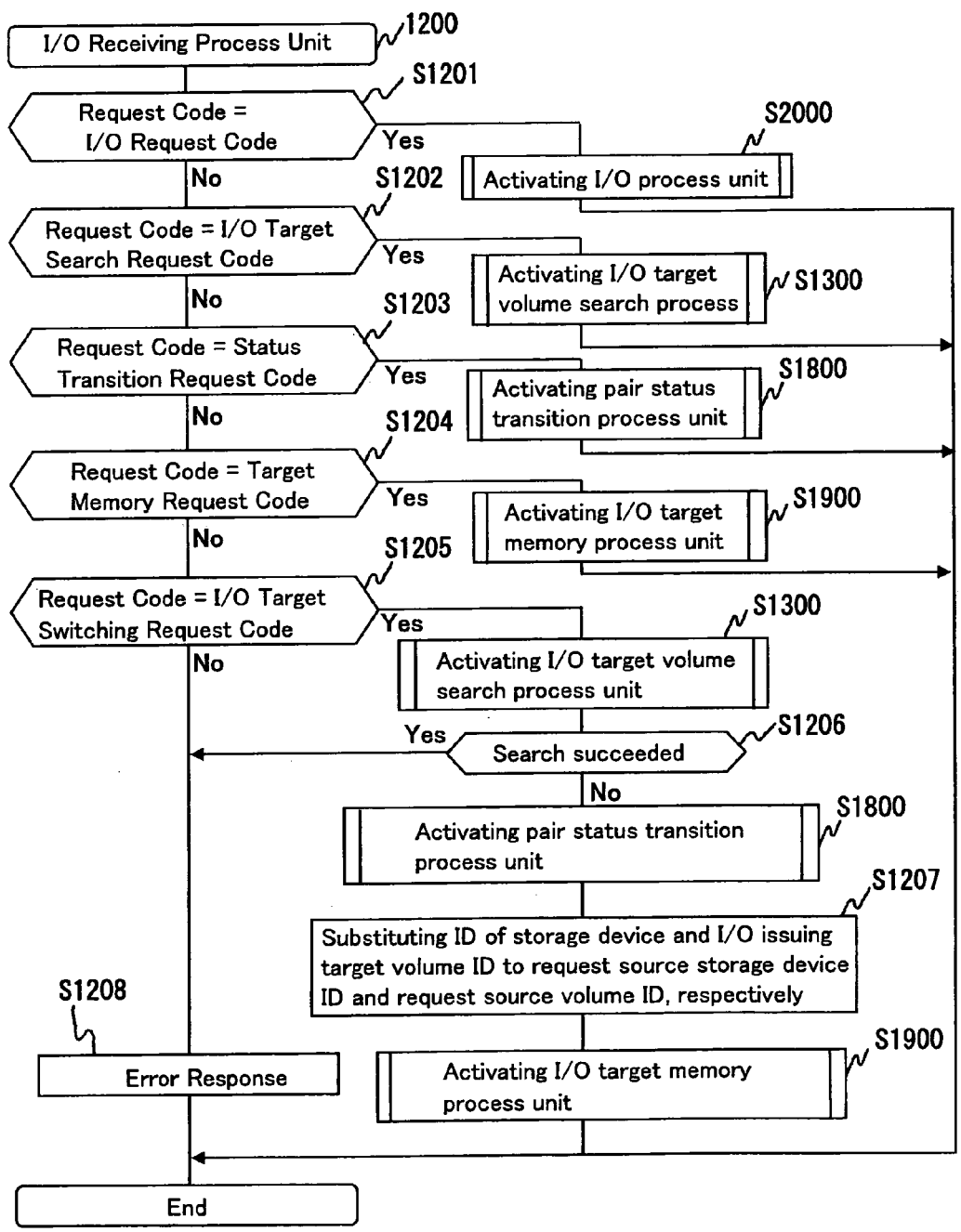
FIG. 12 is a flow chart that shows an I/O receiving process regarding an embodiment of the present invention.

In a flow chart of FIG. 12, if the request code 705 is an I/O request code sent from the host I/O process unit 800 of the host computer 10 or from the I/O process unit 2000 of another storage device 20 ("Yes" at S1201), then the I/O receiving process unit 1200 activates the I/O process unit 2000 (S2000) thus terminating the process.

If the request code 705 is an I/O target search request code indicating an I/O target search request sent from another storage device ("Yes" at S1202), then the I/O receiving process unit 1200 activates the I/O target volume search process unit 1300 (S1300) thus terminating the process.

If the request code 705 is a status transition request code ("Yes" at S1203), then the I/O receiving process unit 1200 activates the pair status transition process unit 1800 (S1800) thus terminating the process.

If the request code 705 is a target memorizing request code ("Yes" at S1204), then the I/O receiving process unit 1200 activates the I/O target memory process unit 1900 (S1900) thus terminating the process.

If the request code 705 is an I/O target switching request code sent from the switching request process unit 1100 of the host computer 10 ("Yes" at S1205), then the I/O receiving process unit 1200 activates the I/O target volume search process unit 1300 (S1300).

In this case, if the search process at S1300 fails ("No" at S1206), then the I/O receiving process unit 1200 sends an error response to the host computer 10 (1208) and, then terminates the process.

Otherwise, if the search process at S1300 succeeded ("Yes" at S1206), then the I/O receiving process unit 1200 activates the pair status transition process unit 1800 (S1800). Subsequently, the I/O receiving process unit 1200 substitutes the storage device ID to which the I/O receiving process unit 1200 itself belongs and the I/O issuing target volume ID 704 into the request source storage device ID 1001 and the request source volume ID 1002, respectively (S1207).

The I/O receiving process unit 1200 activates the I/O target memory process unit 1900 (S1900).

Figure 13:
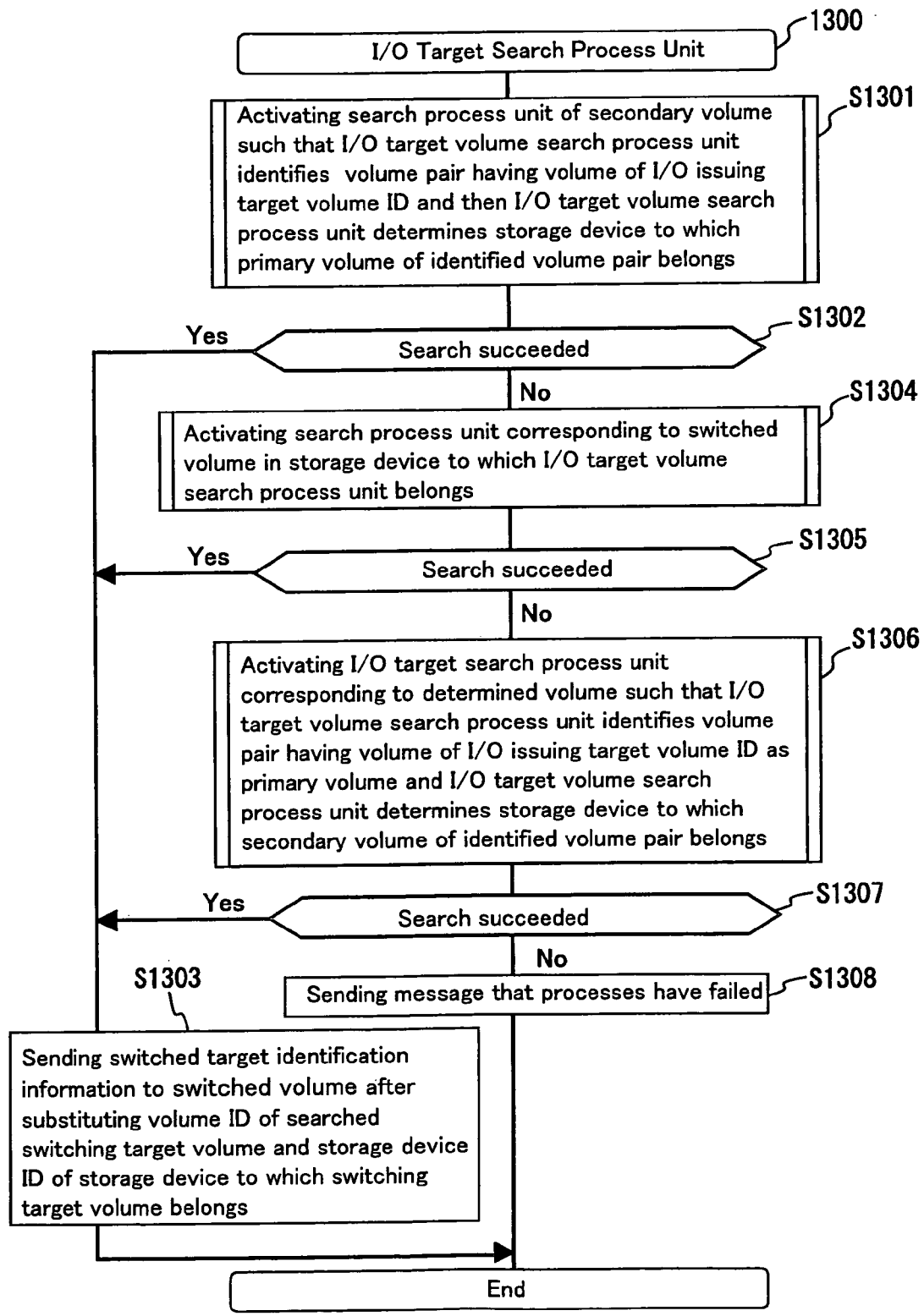
FIG. 13 is a flow chart that shows an I/O target volume search process regarding an embodiment of the present invention.

In a flow chart of FIG. 13, the I/O target volume search process unit 1300 identifies a volume pair having a volume of the I/O issuing target volume ID 704 as the secondary volume. Then, the I/O target volume search process unit 1300 determines a storage device to which the primary volume of the identified volume pair belongs and activates a search process unit 1400 (not shown) corresponding to the determined (switched) volume (S1301).

If the process of S1301 succeeded ("Yes" at S1302), then the I/O target volume search process unit 1300 substitutes the volume ID of the switched volume and the storage device ID of the device to which the switched volume belongs into the switched target identification information 1010. Subsequently, the I/O target volume search process unit 1300 sends the switched target identification information 1010 to the switched volume (S1303) thus terminating the process.

The I/O target volume search process unit 1300 activates a search process unit 1500 (not shown) corresponding to the switched volume in the storage device to which the I/O target volume search process unit 1300 belongs (S1304). If the process of S1304 succeeded ("Yes" at S1305), then the switched target identification information 1010 is sent to the switched volume (S1303).

The I/O target volume search process unit 1300 identifies a volume pair having a volume of the I/O issuing target volume ID 704 as a primary volume. Then, the I/O target volume search process unit 1300 determines a storage device to which the secondary volume of the identified volume pair belongs, and activates an I/O target search process unit 1700 (not shown) corresponding to the determined (switched) volume (S1306). If the process of S1306 succeeded ("Yes" at S1307), then the switched target identification information 1010 is sent to the switched volume (S1303).

If all above processes fail ("No" at S1307), then the I/O target volume search process unit 1300 sends a message that the processes have failed (S1308).

Figure 14:
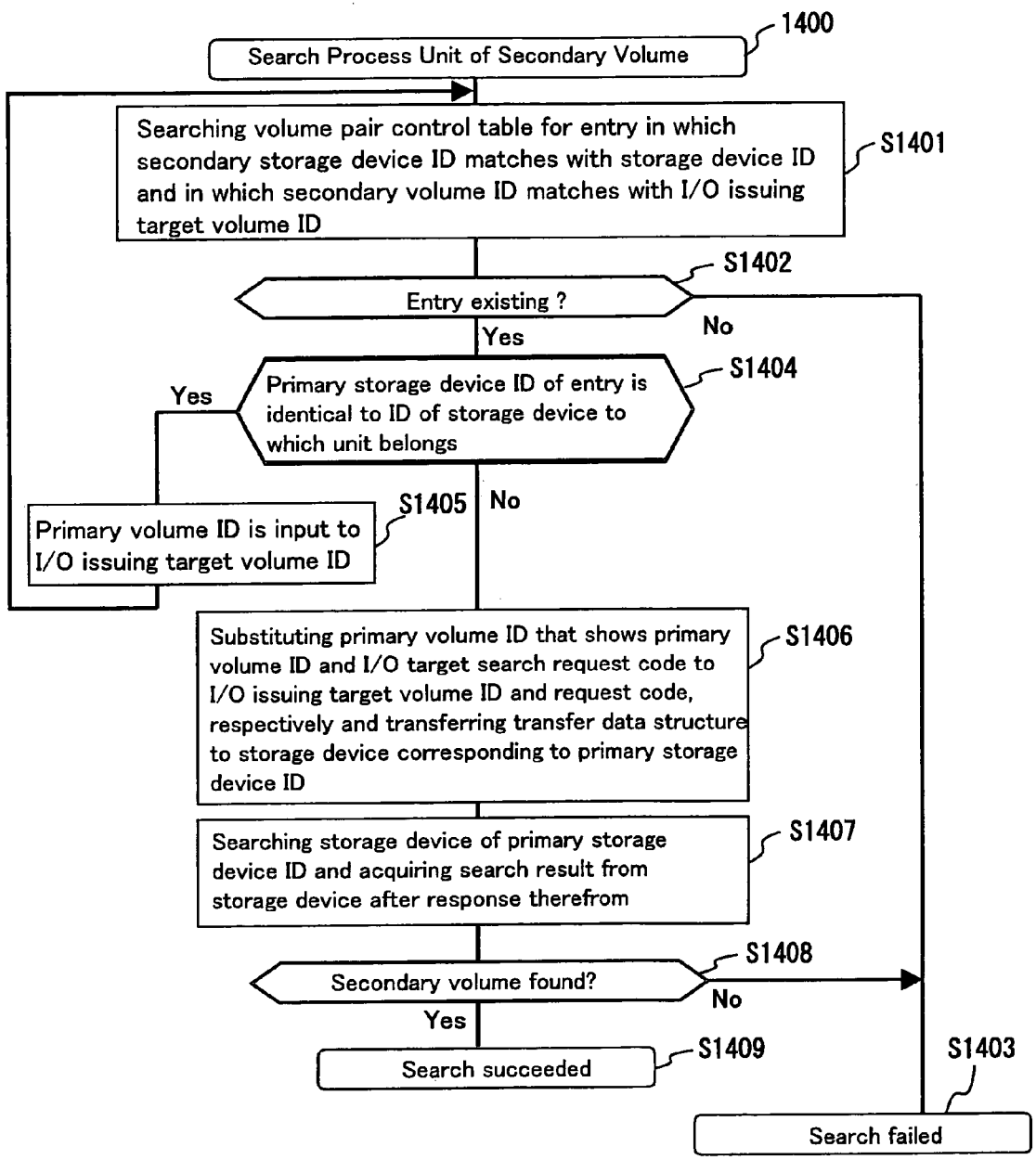
FIG. 14 is a flow chart that shows an I/O target volume search process, which is in the primary storage device, regarding an embodiment of the present invention.

In a flow chart of FIG. 14, the search process unit 1400 corresponding to the secondary volume searches the volume pair control table 200 for an entry in which the secondary storage device ID 221 matches with the storage device ID, and in which the secondary volume ID 222 matches with the I/O issuing target volume ID 704 (S1401). If the entry does not exist ("No" at S1402), the result of the search is made to be failed (S1403).

Otherwise, if the entry exists ("Yes" at S1402), the following processes are performed. If the primary storage device ID 211 of the entry is identical to the storage device to which the unit 1400 belongs ("Yes" at S1404), then the pair is determined to be generated by the local-copy. Then, to search a pair which is generated by the remote-copy and which has the primary volume by the local-copy as a secondary volume, the primary volume ID 212 is input to the I/O issuing target volume ID 704 (S1405), and the processes from S1401 are performed again.

If the primary storage device ID 211 of the entry is not identical to the storage device to which the unit 1400 belongs ("No" at S1404), then primary volume ID 212 that shows the primary volume ID and the I/O target search request code are substituted to the I/O issuing target volume ID 704 and the request code 705, respectively. Subsequently, the transfer data structure 700 is transferred to the storage device 20 corresponding to the primary storage device ID 211 (S1406).

Furthermore, the search process unit 1400 corresponding to the secondary volume searches the storage device 20 of the primary storage device ID 211. Then, the search process unit 1400 acquires the search result from the storage device 20 (S1407).

If the secondary volume exists ("Yes" at S1408), then the result of the search is made to be a success (S1409).

Figure 15:
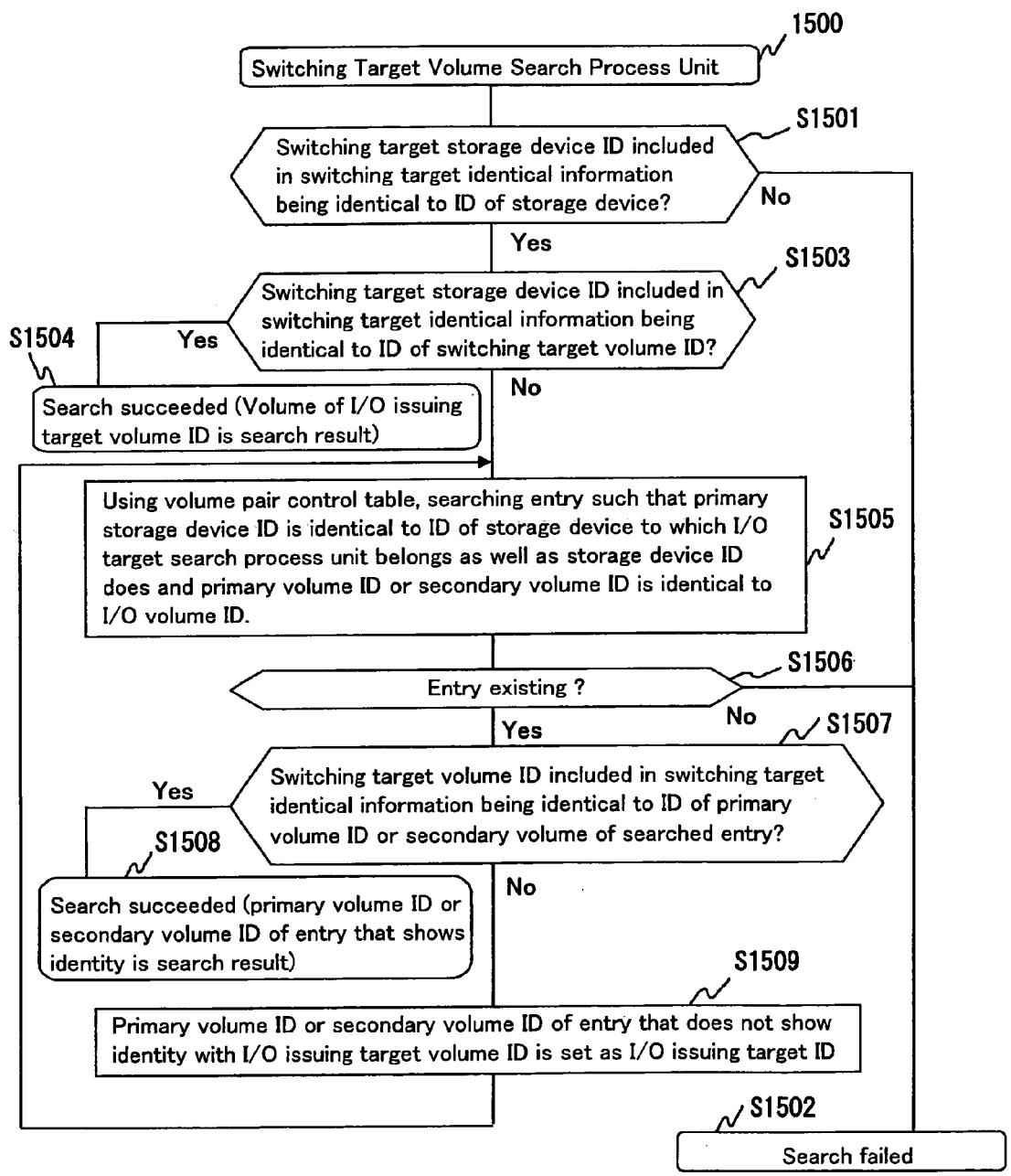
FIG. 15 is a flow chart that shows an I/O target volume search process, which is in a self storage device in the case that identification information of the switching target is the volume ID, regarding an embodiment of the present invention.

FIG. 15 is the flow chart that shows I/O target volume search process wherein the volume 26 in the storage device 20 is the target when the switching target storage device ID 1011 and the switching target volume ID 1012 are assigned for the switching target identification information 1010.

The search process unit 1500 in the switching target volume fails searching (S1502) if the switching target storage device ID 1011 is identical to ID of the storage device 20 ("No" in S1501).

The search process unit 1500 of the switching target volume completes searching (S1504) and the volume of the I/O issuing target volume ID 704 is set as the search result if the switching target storage device ID 1011 is identical to the ID of the storage device 20 ("Yes" in S1503).

Using the volume pair control table 200, the search process unit 1500 of the switching target volume searches for an entry such that the primary storage device ID 211 is identical to the ID of the storage device 20 to which the I/O target search process unit 1500 belongs as well as the storage device ID221 does and the primary volume ID 212 or the secondary volume ID 222 is identical to the I/O volume ID 704 (S1505).

If there exists an entry in S1505 ("Yes" in S1506), the search process unit 1500 of the I/O switching target volume searches whether the switching target volume ID 1012 in the switching target identification information 1010 is identical to the primary volume ID 212 or the secondary volume ID 222. If an identical entry is obtained ("Yes" in S1507), the search is completed and the primary volume ID 212 or the secondary volume ID 222 is set as the search result (S1508).

If the search process unit 1500 of the I/O switching target volume does not show such an identical entry as described above ("No" in S1507), the process is repeated from S1505 as the primary volume ID 212 or the secondary volume ID 222, either of which entry is not identical to the I/O issuing target volume is set as the I/O issuing target ID 704 (S1509).

Figure 16:
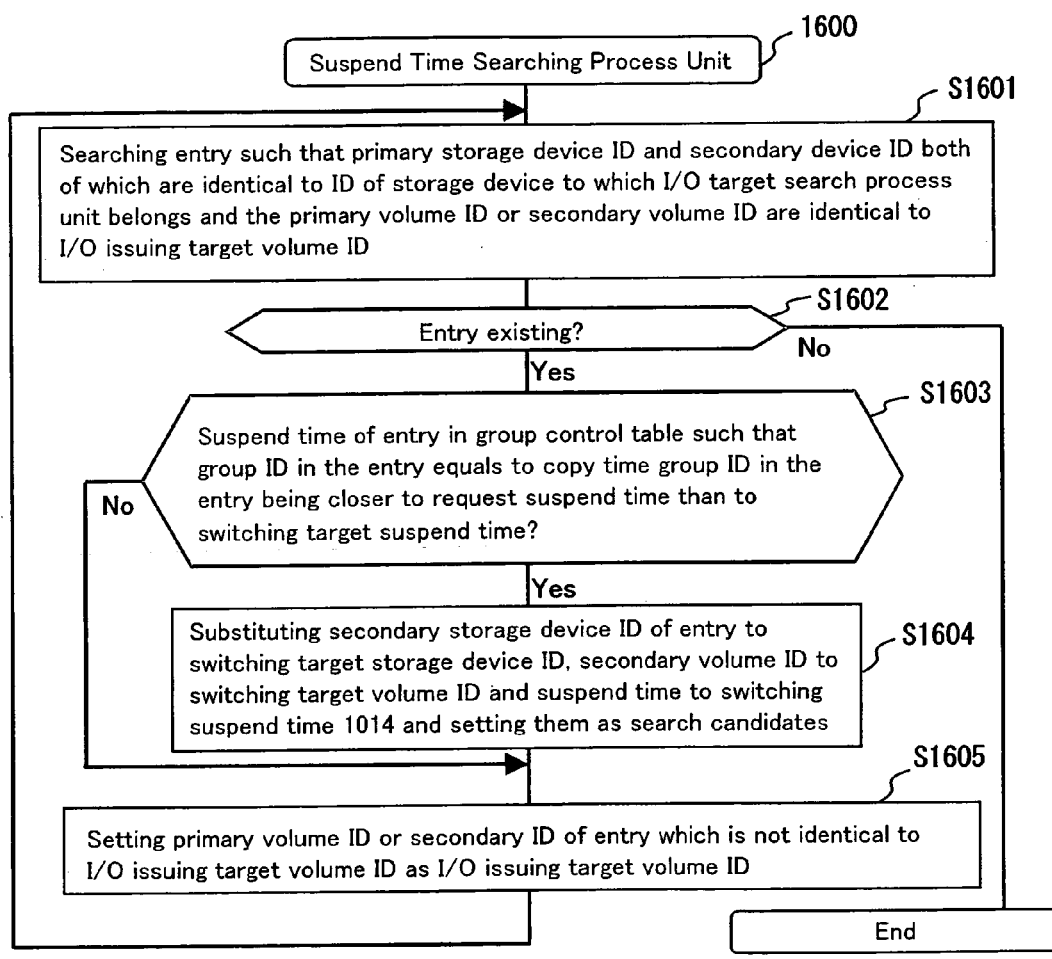
FIG. 16 is a flow chart that shows the I/O target volume search process, which is in a self storage device in the case that the identification information of the switching target is suspend time, regarding an embodiment of the present invention.

FIG. 16 is a flow chart of the I/O target volume search process of which target is the volume of the storage device wherein the request suspend time 1013 is assigned to the switching target identification information 1010.

First, in the volume pair control table 200, the search process unit 1600 in the suspend time searches for an entry such that the primary storage device ID 211 and the secondary device ID 221 both of which are identical to the ID of the storage device 20 to which the I/O target search process unit 1500 belongs and the primary volume ID 212 or the secondary volume ID 222 are identical to the I/O issuing target volume ID 704 (S1601).

The search process unit 1600 of the suspend time stops the process if no entry exists (S1602).

The search process unit 1600 of the suspend time substitutes the secondary storage device ID 221 of the entry to the switching target storage device ID 1011, the secondary volume ID 222 to the switching target volume ID 1012 and the suspend time to the switching suspend time 1014 and sets them as the search candidates (S1604) if the suspend time of the entry in the group control table 300 is such that the group ID 201 in the entry equals to the copy time 203 group ID 201 in the entry is closer to the request suspend time 1013 than to the switching target suspend time 1014 ("Yes" in S1603).

Further more, the search process unit 1600 of the suspend time repeats the process from S1601 as setting the primary volume ID 212 or the secondary ID 222 of the entry which is not identical to the I/O issuing target volume ID 704 as the I/O issuing target volume ID 704 (S1605).

Figure 17:
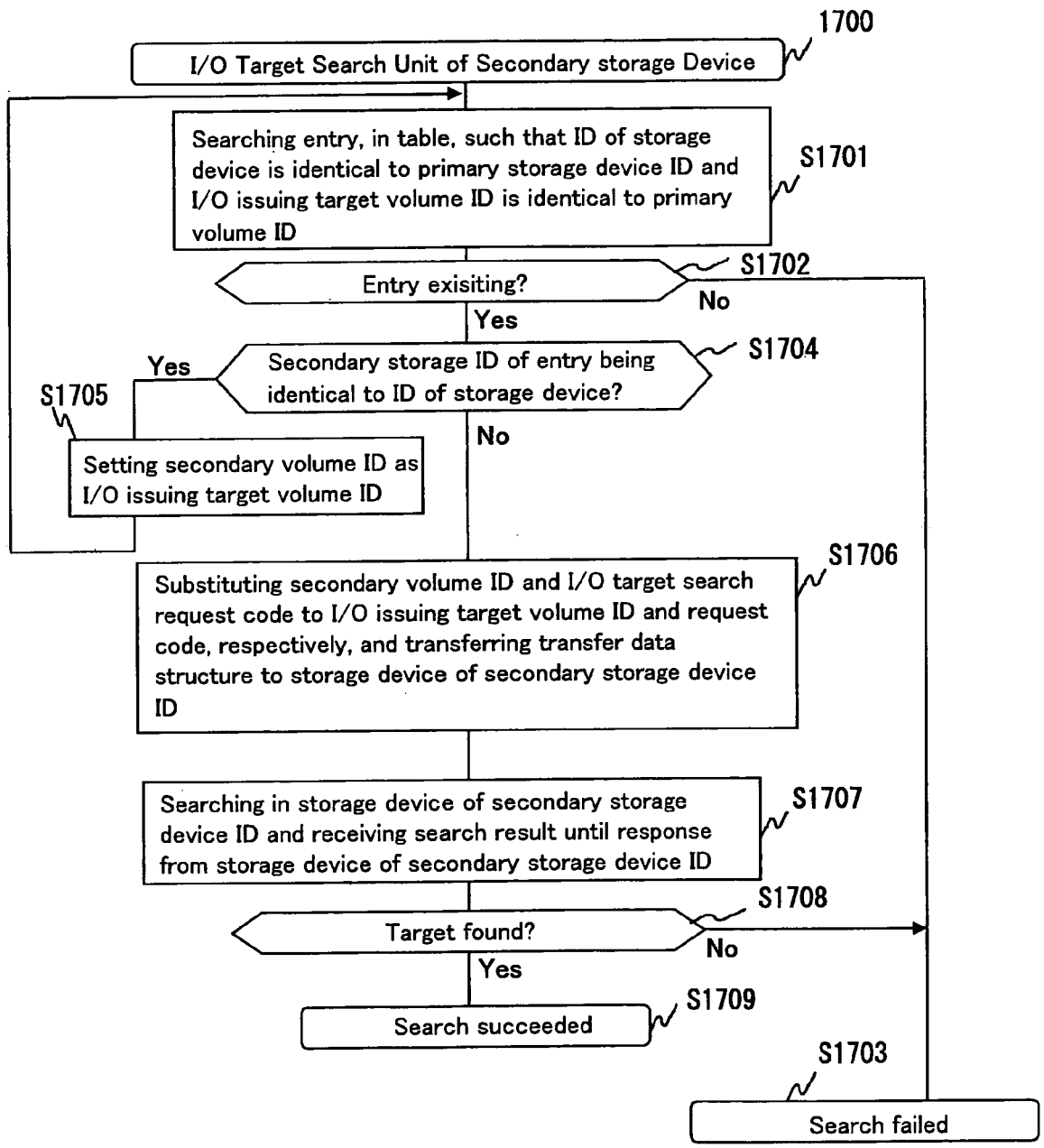
FIG. 17 is a flow chart that shows an I/O target volume search process, which is in the secondary storage device, regarding an embodiment of the present invention.

FIG. 17 is a flow chart that shows the I/O target volume search process in the secondary storage device.

In the table 200, the I/O target search process unit 1700 of the secondary storage device searches for an entry such that the ID of the storage device 20 is identical to the primary storage device ID 211 and the I/O issuing target volume ID 704 is identical to the primary volume ID 212 (S1701). If no entry exists, the search is set as failed (S1703).

In the next stage, since the I/O target search unit 1700 of the secondary storage device is a pair of the local copy, the I/O target search unit 1700 of the secondary storage devices repeats to execute the secondary volume ID 222 as the I/O issuing target volume ID 704 (S1705) in order to search for the pair of the remote copy that sets the secondary volume of the local copy as the primary volume from S1701 (S1705), if the secondary storage ID 221 of the entry is identical to the ID of the storage device 20 ("Yes" in S1704).

Then, since the I/O target search unit 1700 of the secondary storage device substitutes the secondary volume ID 222 and the I/O target search request code to the I/O issuing target volume ID 704 and request code 705, respectively, transfers the transfer data structure 700 to the storage device 200 of the secondary storage device ID 221 (S1706), searches in the storage device 20 of the secondary storage device ID 221 and receives the search result (S1707) until the response from the storage device 20 of the secondary storage device ID 221.

In the processes as shown in FIG. 13 to FIG. 17, it is possible to search and specify the volume which may be the I/O target from the copies of the volumes including I/O issuing targets as well as the volumes in the storage devices other than the I/O issuing targets.

It is checked whether the volume which is the I/O target is in a switchable status or not. When the volume which is the target of the I/O is the secondary volume of the volume pair, the differential information is independently transferred from the I/O request sent from the host computer 10 for the pair status of DUPLEX and PENDING and it is not possible to maintain the compliance of the volume contents.

Therefore, it is necessary to change the volume pair status, such that the volume which is the I/O target is set as the secondary volume, to SUSPEND by means of the pair status transition process unit 1800. Moreover, the pair sequentially change to the SUSPEND after tracing back to the volume which is not in the SUSPEND status or pair (the pair of SIMPLEX status) when the primary of the pair is the secondary volume as well.

Figure 18:
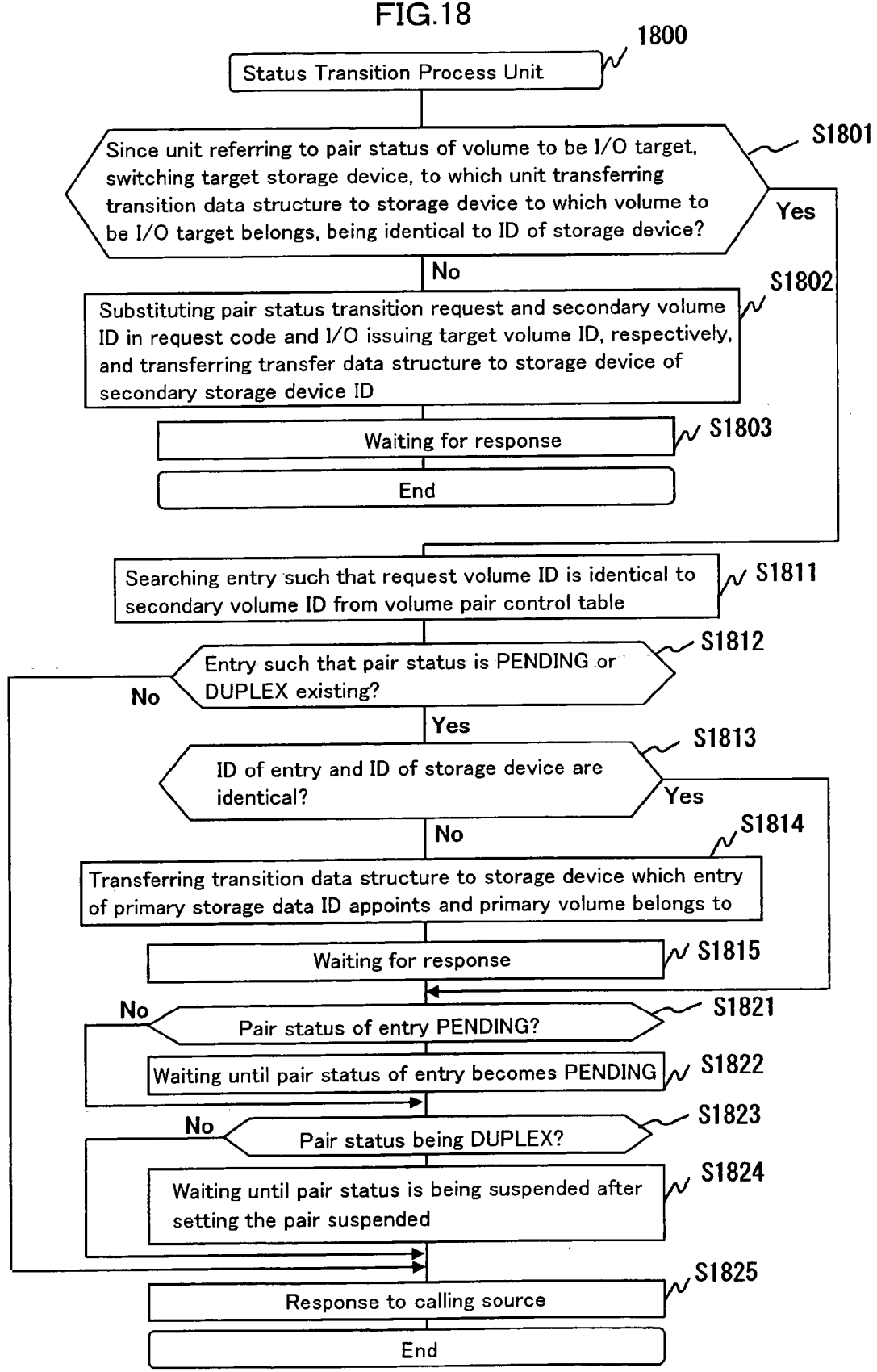
FIG. 18 is a flow chart that shows the pair transition process regarding an embodiment of the present invention.

FIG. 18 is the flow chart of the pair status transition process unit 1800.

The pair status transition process unit 1800 transfers the transfer data structure 700 to the storage device 20 to which the volume to be the I/O target belongs, since the unit refers to the pair status of the volume to be the I/O target. When the switching target storage device ID 1011 is not identical to the ID of the storage device 20 ("No" in S1801), the pair status transition request is substituted into the request code 705, the secondary volume ID 222 is substituted in the I/O issuing target volume ID 704, the transfer data structure 700 is transferred to the storage device 20 of the secondary storage device ID 221 (S1802) and the process is ended with waiting after the response (S1803).

When the pair status transition process unit 1800 coincides ("Yes" in S1801), the unit shifts itself up to the pair that has the status other than PENDING and DUPLEX.

The pair status transition process unit 1800 searches, from the volume pair control table 200, for an entry such that the request volume ID 1002 is identical to the secondary volume ID 222 (S1811).

The pair status transition process unit 1800 completes the process searches of the pair status 202, in such case that the entry to be PENDING or DUPLEX does not exist ("No" in S1812), in response to the calling source (S1825).

The pair status transition process unit 1800 transfers, when the ID of the entry and the ID of the storage device is not identical ("No" in S1813), the transition data structure 700 to the storage device 20 which the entry of the primary storage data ID211 appoints and the primary volume belongs to (S1814) and waits for the response (S1815).

The pair status transition process unit 1800 shifts the pair status to suspend and waits until the pair status 202 of the entry (S1822) is PENDING ("Yes" in S1821).

The pair status transition process unit 1800 keeps the pair status in suspending and waits until the pair status 202 is suspended (S1824) after setting the pair to suspended if the pair status is DUPLEX ("Yes" in S1823).

After shifting to the switchable status, the ID of the volume to be the I/O target and the ID of the storage device 20 to which the volume belongs are memorized in the shared memory 27 in the storage device 20 which contains each volume of the copy volume group in order to judge the I/O target upon the I/O request.

Figure 19:
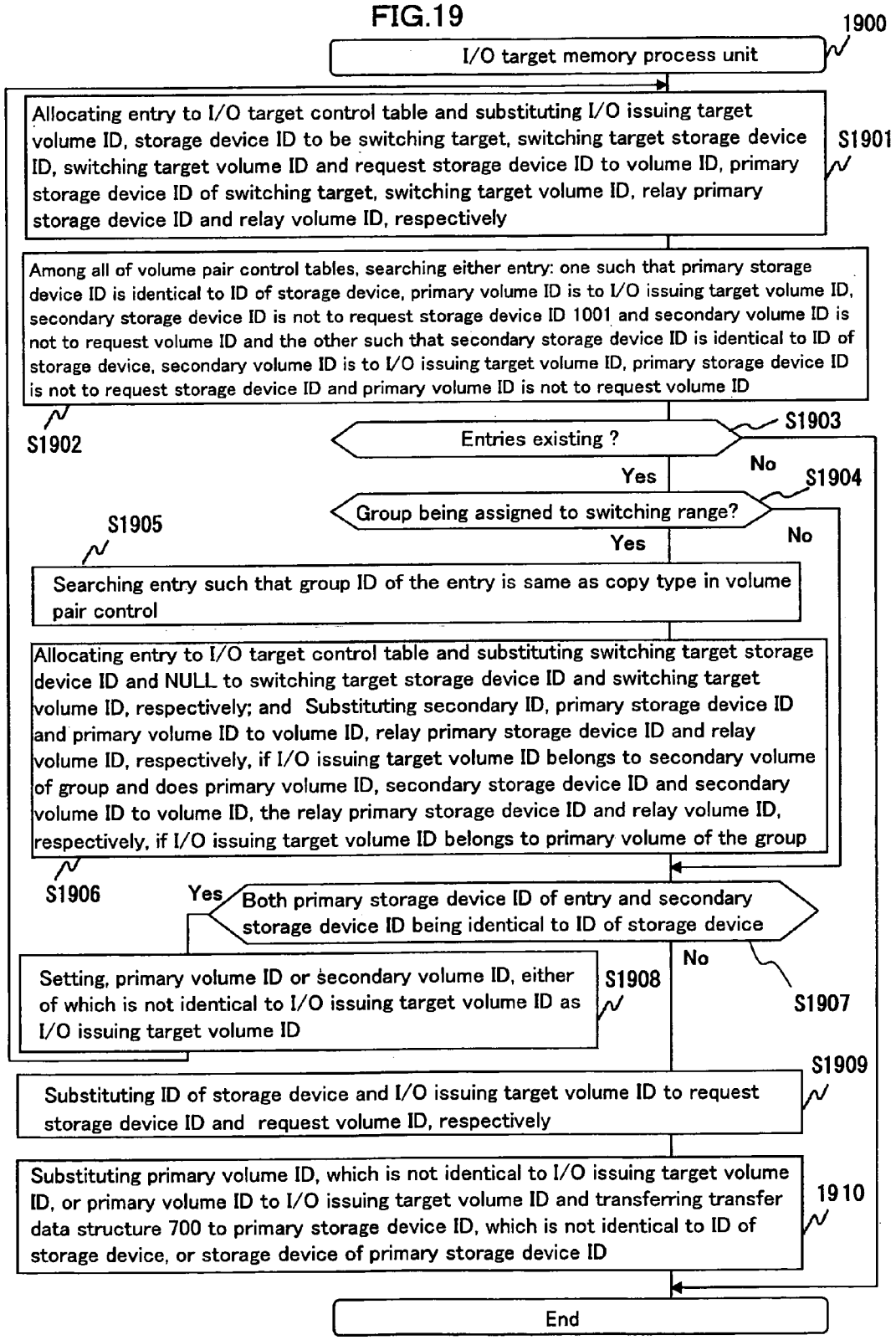
FIG. 19 is a flow chart that shows the I/O target memory process regarding an embodiment of the present invention.

FIG. 19 shows flow chart of the I/O target memory process unit 1900.

The I/O target memory process unit 1900 allocates the entry to the I/O target control table 400 and substitutes the I/O issuing target volume ID 704, the storage device ID to be switching target, the switching target storage device ID, the switching target volume ID and request storage device ID 1001 to the volume ID 401, the primary storage device ID 402 of the switching target, the switching target volume ID 403, the relay primary storage device ID 404 and the relay volume ID 405, respectively (S1901).

Among all of the volume pair control tables 200, the I/O target memory process unit 1900 searches the either entry (S1902): one such that the primary storage device ID 211 is identical to the ID of the storage device 20, the primary volume ID 212 is to the I/O issuing target volume ID 704, the secondary storage device ID 221 is not to the request storage device ID 1001 and the secondary volume ID 222 is not to the request volume ID 1002, and the other such that the secondary storage device ID 221 is identical to the ID of the storage device 20, the secondary volume ID 222 is to the I/O issuing target volume ID 704, the primary storage device ID 211 is not to the request storage device ID 1001 and the primary volume ID 212 is not to the request volume ID 1002.

The I/O target memory device process unit 1900 executes the steps S1904 to S1910 for the all entries searched in S1902 and ends the process if none of the entries exists (S1903).

The I/O target memory process unit 1900 memorizes the ID of the storage device to which the volume, belonging to the same group as the volume of the I/O issuing target volume ID 704, is switched and the ID if the group is assigned to the switching range 1003 ("Yes" in S1904) and searches for an entry such that the group ID 201 of the entry is same as the copy type 203 in the volume pair control table 200 (S1905).

The I/O target memory process unit 1900 allocates the entry to the I/O target control table 400 and substitutes the switching target storage device ID and NULL to the switching target storage device ID 402 and the switching target volume ID 403, respectively. The I/O target memory process unit 1900 substitutes the secondary ID 222, the primary storage device ID 211 and the primary volume ID 212 to the volume ID 401, the relay primary storage device ID 404 and the relay volume ID 405, respectively, if the I/O issuing target volume ID 704 belongs to the secondary volume of the group and does the primary volume ID 212, the secondary storage device ID 221 and the secondary volume ID 222 to the volume ID 401, the relay primary storage device ID 404 and the relay volume ID 405, respectively, if the I/O issuing target volume ID 704 belongs to the primary volume of the group (S1906).

The I/O target memory process unit 1900 repeatedly executes the primary volume ID 212, which is not identical to the I/O issuing target volume ID 704, or the secondary volume ID 222 as I/O issuing target volume ID 704 (S1909) from the step S1901 for the purpose of allocating the entry of I/O target control table 400 to the volume 26 which corresponds to the pair of the local copy if both the primary storage device ID 211 of the entry and the secondary storage device ID 221 are identical to the ID of the storage device 20 ("Yes" in S1907)

If both the primary storage device ID 211 of the entry and the secondary storage device ID 221 are identical to the ID of the storage device 20 ("No" in S1907), the I/O target memory process unit 1900 substitutes the ID of the storage device 20 and the I/O issuing target volume ID 704 to the request storage device ID 1001 and the request volume ID 1002 (S1909), respectively, for the purpose of allocating the entry of the I/O target control table 400 to the storage device of the volume which corresponds to the pair of the remote copy.

The I/O target memory process unit 1900 substitutes the primary volume ID 211, which is not identical to the I/O issuing target volume ID 704, or the primary volume ID 212 to the I/O issuing target volume ID 704 and transfers the transfer data structure 700 to the primary storage device ID 211, which is not identical to the ID of the storage device 20, or the storage device 20 of the primary storage device ID 211 (S1910).

Figure 20:
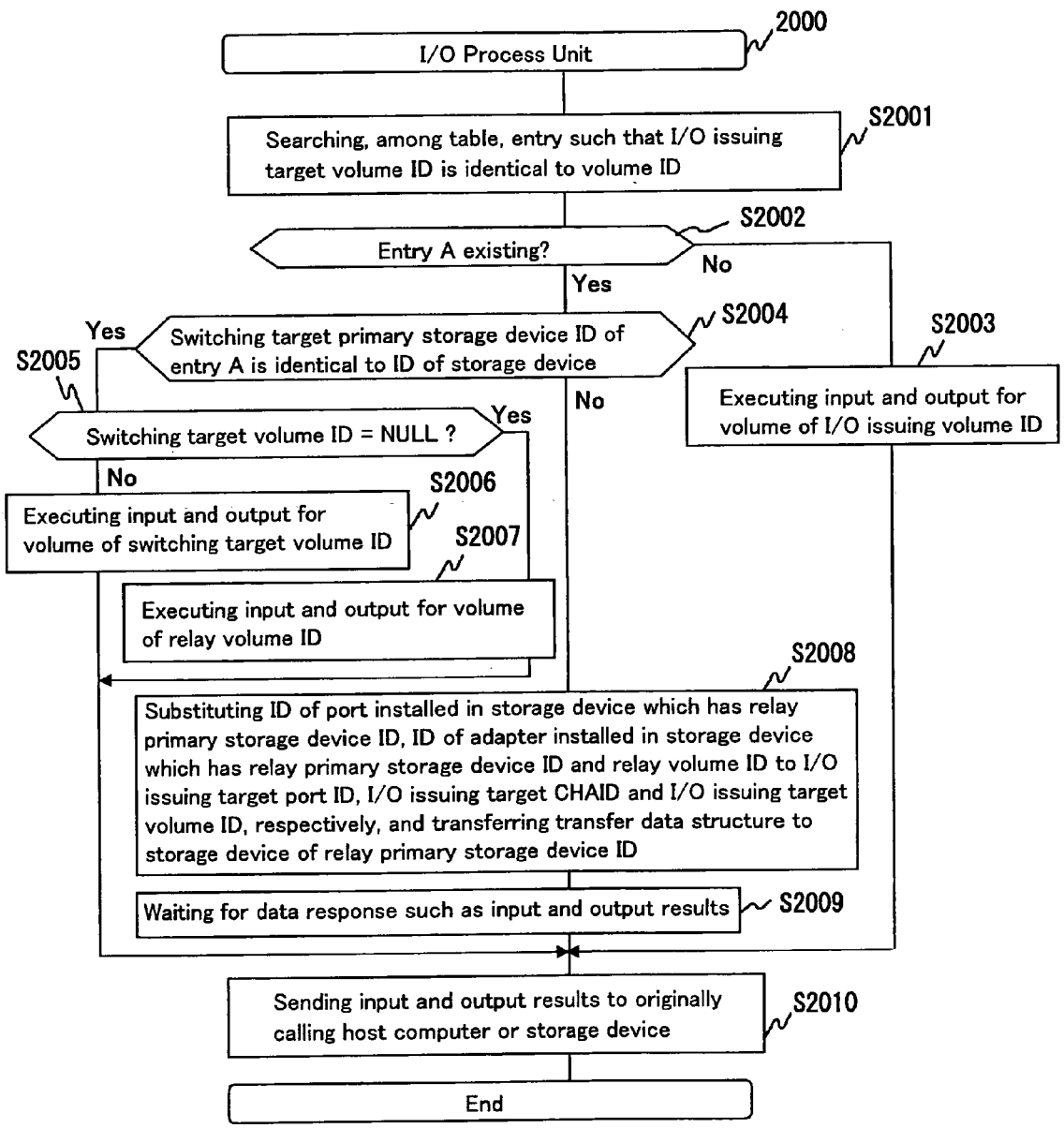
FIG. 20 is a flow chart that shows an I/O process regarding an embodiment of the present invention.

FIG. 20 shows the flow chart of the I/O process unit 2000.

The I/O process unit 2000 searches, among the table 400, for an entry such that the I/O issuing target volume ID 704 is identical to the volume ID 401 (S2001) and executes the input and the output for the volume 26 of the I/O issuing volume ID 704 (S2003), since it is not the I/O target if the entry A does not exist ("No" in S2002).

If the entry exists ("Yes" in S2002), the switching target primary storage device ID 402 of the entry A is identical to the ID of the storage device 20 ("Yes" in S2004) and the I/O volume ID 403 is not NULL ("No" in S2005), the I/O process unit 2000 executes the input and the output for the volume 26 of the switching target volume ID 403 (S2006).

In the case of group assignment, the relay volume ID 405 is referred to because the switching target volume ID 403 is NULL (the relay volume ID 405 indicates the switching target if the switching primary storage device ID 402 and the relay primary storage device ID 404 are identical).

If the switching target volume ID 403 is NULL ("Yes" in S2005), the I/O process unit 2000 executes the input and the output for the volume 26 of the relay volume ID 405 (S2007).

Furthermore, if the switching target primary storage device ID 402 is not identical to the ID of the storage device 20 ("No" in S2004), the I/O process unit 2000 substitutes the ID of the port 21 installed in the storage device which has the relay primary storage device ID 404, the ID of the adapter 22 installed in the storage device which has the relay primary storage device ID 404 and the relay volume ID 405 to the I/O issuing target port ID 702, the I/O issuing target CHA ID 703 and the I/O issuing target volume ID 704, respectively, and transfers the transfer data structure 700 to the storage device 20 of the relay primary storage device ID 404 (S2008).

The I/O process unit 2000 waits for the data response such as the input and output results (S2009) and sends the input and output results to the original calling host computer 100 or the storage device 20 (S2010).

In the discussion so far, it is understood that the I/O targets are switched against the I/O request from any of the computers once a computer requests the switching of the I/O targets. However, it is possible that the computer that requests the switching of the I/O targets only switches the I/O targets. Therefore, as shown in FIG. 19 and FIG. 20, the I/O process unit 2000 memorizes the I/O target control table 400 in S1901 of the I/O target memory process unit 1900 and executes the input and output for the volume 26 of the I/O issuing target volume ID 704 but not for the switching target if the computer ID 701 is not identical to the computer ID memorized in the I/O target control table 400, in S2002 of the I/O process unit 2000, even if the entry A exists.

Figure 21:
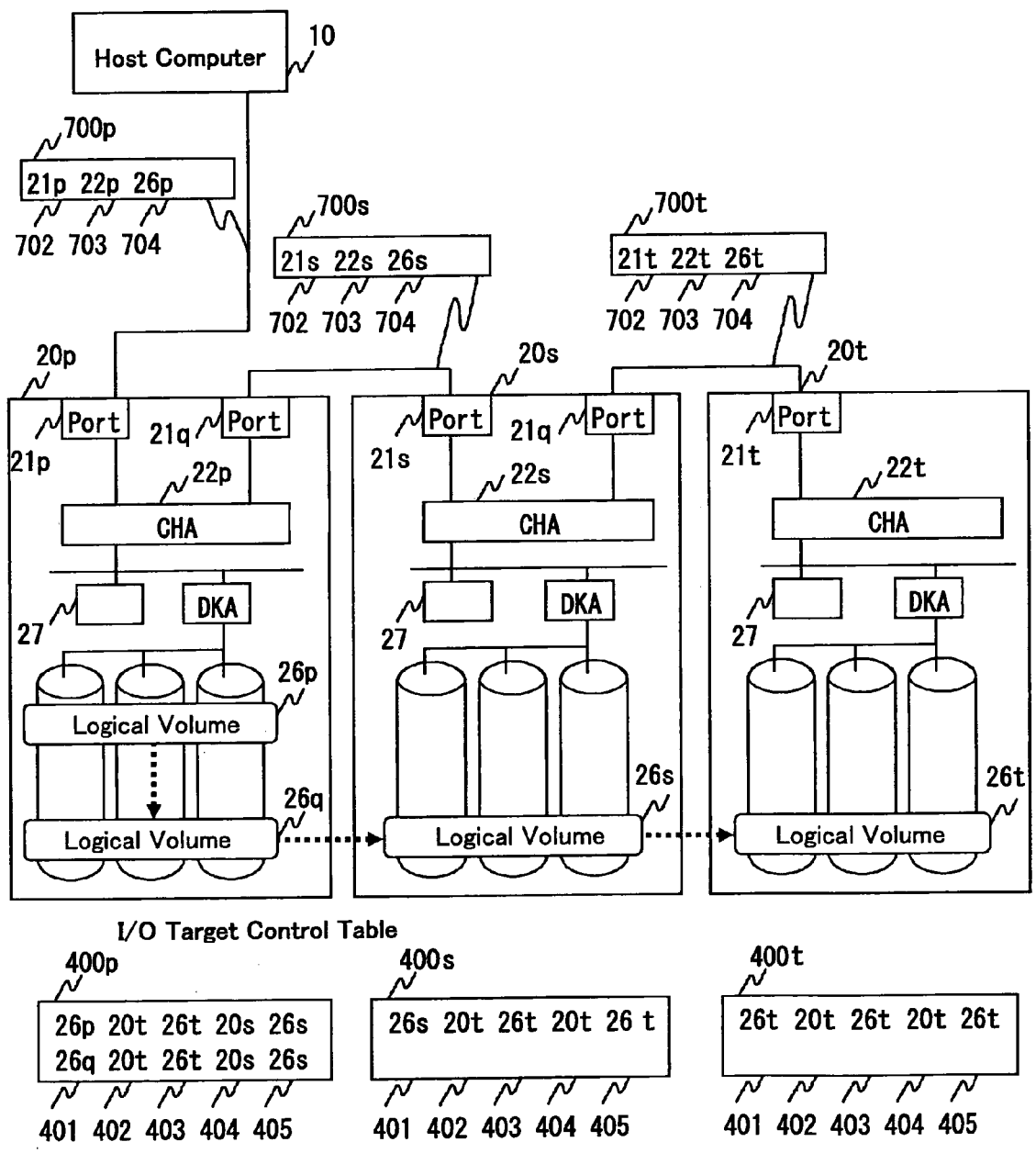
FIG. 21 is a schematic that explains an example of a table content which is used in the cascaded structure in the present invention regarding an embodiment of the present invention.

An example of the table contents which is used for the embodiment of the present invention which has a cascaded configuration is illustrated in FIG. 21. The I/O target control table 400 is the one to which the primary volume 26p that has the intra-host ID provided by host computer 10 and is the I/O target control table in the storage device 20p which is connected with the host computer 10. The secondary volume 26q is the secondary volume of the local copy of the primary volume 26p. The I/O target control table 400s is the I/O target control table 400 of the storage device 20s which is connected with the primary storage device 20p. The secondary volume 26s is the secondary volume of the storage device 20t which is connected with the storage device 20s. The volume 26t is the secondary volume of the remote copy of the secondary volume 26s.

As shown in FIG. 21, the I/O target is the volume 26t and the ID of the volume 26t is set in the I/O switching target volume ID 403. The ID of the storage device 20s is set for the relay primary storage device ID 404 since the access is executed in such a transferring that the transfer data structure 700 is transferred to the storage device 20s which transfers the transfer data structure 700 to the storage device 20t via the storage device 20s from the primary storage device 20p in order to access to the volume 26t from the host computer 10

In the discussion so far, the I/O targets are switched by the request from the host computer 10. However, there is a case such that the switching is possible according to the internal status of the storage device 20. For example, when the secondary volume of the remote copy has the same structure as the primary volume of the local copy, and it is necessary to access the secondary volume of the local copy since the primary volume of the local copy has been updated in case that the pair status of the remote copy is DUPLEX just before the storage device 20 to which the primary volume of the remote copy has failure if the consistency is not guaranteed and the pair status of the local copy is SUSPEND. If the pair status of the remote copy is SUSPEND, the primary volume of the local copy has the consistency and the latest updated data is obtained if the primary volume is used.

As has been discussed above, it is possible to judge which local copies we access from the pair status on the basis of the pair status. Even if the intra-host ID is allocated only for the primary volume of the local copy in the host computer which is connected to the local copy, it is possible to access the consistent data before the completion of returning the primary volume from the secondary volume by changing the access target to be the secondary volume.

By setting the status monitoring process 2200 that can monitor the pair condition, it is possible to switch without waiting for the instruction from the host computer 10 as well.

Figure 22:
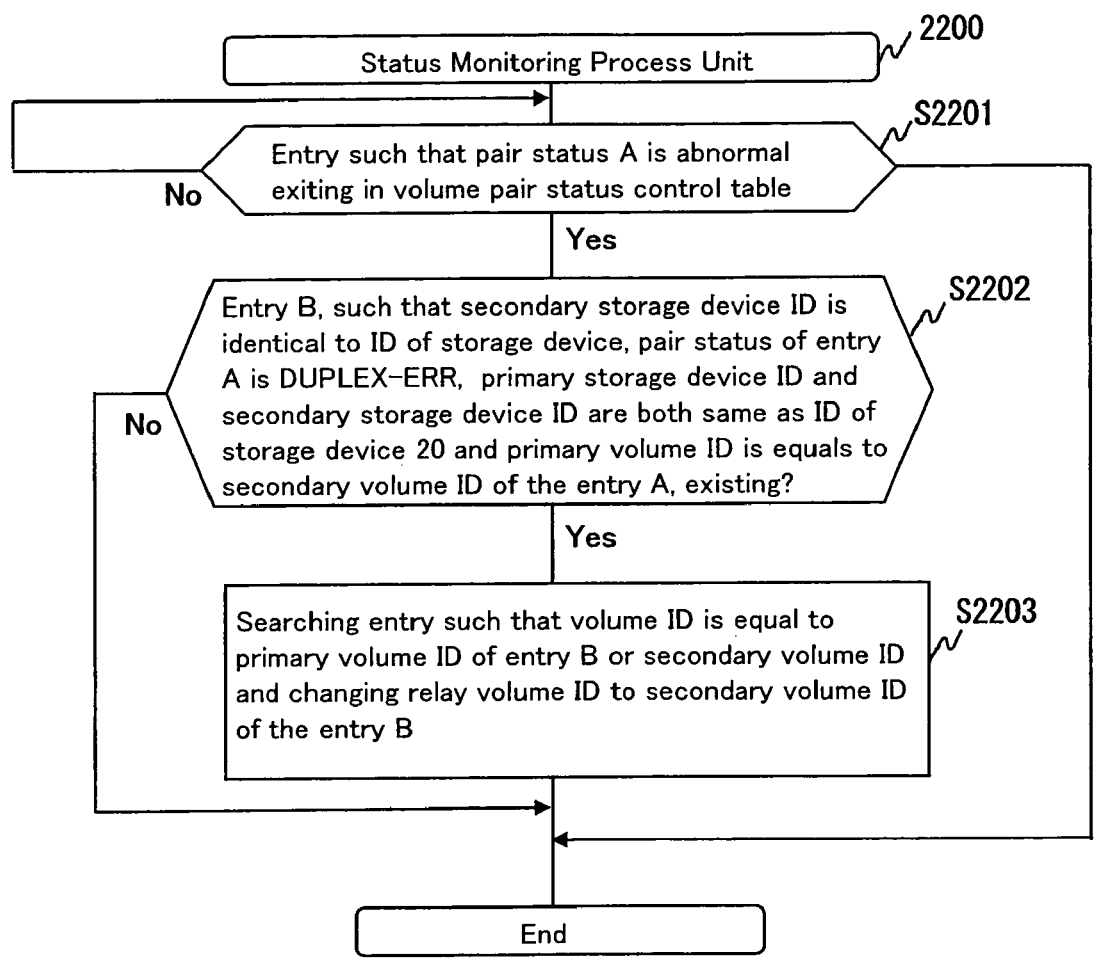
FIG. 22 is a flow chart that shows a status monitoring process regarding an embodiment of the present invention.

FIG. 22 shows a flow chart regarding the status monitoring process unit 2200.

The status monitoring process unit 2200 keeps searching the pair status in volume pair status control table 200 until an entry is such that the pair status A is abnormal (S2201).

In the case that the entry A exists ("Yes" in S2201), the status monitoring process unit 2200 searches whether an entry B exists, such that the secondary storage device ID 221 is identical to the ID of the storage device 20, the pair status 202 of the entry A is DUPLEX-ERR, the primary storage device ID 211 and the secondary storage device ID 221 are both same as the IDs of the storage device 20 and the primary volume ID 212 is equal to the secondary volume ID 222 of the entry A (S2202).

If the entry B exists, the status monitoring process unit 2200 searches the entry such that the volume ID 401 is equal to the primary volume ID 212 of the entry B or the secondary volume ID 222 and changes the relay volume ID 405 to the secondary volume ID 222 of the entry B (S2203).

As has been discussed above, the storage device regarding an embodiment of the present invention has;

(1) a receiving means to receive the information of the volume ID and the suspend time, being necessary to specify the second logical volume of the I/O target, that are sent to the first logical volume included in the storage device which is allocated within the intra-host ID, (2) a searching means to search the second logical volume among the first logical volume and one or plural third logical volumes, either of which make the relation of source volume and or target volume which is the host free copy function, for the first logical volume, (3) a memory means to memorize the ID of the searched second logical volume in the shared memory in each storage device to which the pair volume of the second logical volume belongs, (4) a waiting means to wait for the completion of changing to the pair status so that the receipt of the differential data is unable, and (5) an I/O means to input and output for the second logical volume in reference to the ID of the second logical volume which is memorized when the request of the input and output to the first logical volume is received.

By using the present storage device, it is possible to increase the quantity of the volumes accessible from the same host computer 10 by allocating the intra-host ID to other volumes since it is possible to access each of the volumes without setting further intra-host IDs for each volume and therefore it is possible to effectively use the storage devices.

Remarkable effects obtained by the embodiments of the present invention are concretely explained.

FIG. 23 illustrates a one-to-one switching table 3000 that is obtained by defining a volume pair 29 of a switching source volume 3010 and a switching target volume 3020 in the scheme that makes a one-to-one relation between the intra-host ID 3030 and the intra-storage ID 3040, both to be compared. It is assumed that the intra-host ID 3030 has a 2 byte length (an amount of addresses of $2^{16}$ which is 65536 addresses allocatable).

In the present scheme to be compared, the intra-storage ID 3040 is limited to the same quantity as the intra-host ID 3030 (e.g., as much as 65535). Therefore, if there are more volumes than there are intra-host IDs, the volumes which are over the maximum number of the intra-host IDs are out of use, and the allocation is a waste of computer resources.

On the other hand, FIG. 24 illustrates a one-to-many switching table 4000 that is created by the switching command issued from the host computer 10 in the embodiment of the present invention.

In the embodiment of the present invention, the intra-host ID 4030 is used for the switching source volume 4010 and the intra-storage IDs 4040-1, 4040-2, 4040-3 are used for the switching target volumes 4020-1, 4020-2, 4030-3, respectively. All of the volumes that satisfy the identification information of the switching target volume included in the switching commands are the switching target volumes 4020. Therefore, the volumes included in the switching table 4000 are the switching target volumes 4020 which are not limited by the quantity of the intra-host IDs 4030 in addition to the switching source volumes 4010 which are limited by the quantity of the intra-host IDs 4010. Accordingly, the excess volumes can be used for the switching target volumes 4020 if there are more volumes than there are intra-host IDs 4010, and it is possible to effectively utilize all the volumes which are available as the computer resources.

From the aforementioned explanation, those skilled in the art will be able to ascertain the essential characteristics of the present invention and can make various modifications and variations to the present invention to adapt it to various usages and conditions without departing from the spirit and scope of the claims.

What is claimed is:

1. A storage device used for a computing system that includes a host computer identifying a volume thereof with an intra-host identifier (ID) and said storage device that identifies said volume thereof with an intra-storage ID comprising:
   a volume pair control table to control volume pairs that execute copy among plural volumes;

an input/output (I/O) receiving process unit to receive a switching command, from said host computer, that makes correspondence between said intra-host ID of a switching source volume and identification information of a switching target volume;

an I/O target search process unit to search said switching target volume, from said volume tables, that is identical to identification information of said switching target volume receipt among switching target candidate volumes that form said volume pair relation with said switching source volume;

an I/O target memory process unit to memorize said intra-host ID of said switching source volume and said intra-storage ID of said switching target volume after being searched in a switching table with corresponding therebetween; and an I/O processing unit to acquire said intra-storage ID of said switching target volume in reference to said switching table in case of receiving an access request such that said intra-host ID of said switching source volume is used as a key, and executes switching to access to said switching target volume.

2. A storage device according to claim 1, wherein said volume table controls volumes in plurality sets of said storage device and said switching source volume and said switching target volume separately locates in said storage device.

3. A storage device according to claim 1, wherein a data length of said intra-host ID is shorter than a data length of said intra-storage ID.

4. A storage device according to claim 1, wherein identification information of said switching target volume is said intra-storage ID of said switching target volume and an ID of said storage device that has said switching target volume.

5. A storage device according to claim 1, wherein identification information of said switching target volume is suspend time of said volume pair of said switching target volume.

6. A storage device according to claim 1, wherein said switching target candidate volume includes a predetermined volume that makes a relation of said volume pair with said switching source volume and a volume that makes a relation of said volume pair with a predetermined volume.

7. A storage device according to claim 1, wherein said volume pair is a pair that executes copy of said switching source volume to said switching target volume and said volume pair changes pair status such that receipt of differential data is unable and has a pair status transition process unit that waits for completion to change pair status such that receipt of differential data is unable.

8. A storage device according to claim 1 having a status monitoring process unit to monitor said volume pair that copy said switching source volume to said pair volume, wherein
   said I/O target memory process unit memorizes a predetermined volume in said switching table as said switching volume for a case that failure status which guarantees that pair status of said volume pair maintains consistency and
   said I/O target memory process unit memorizes a volume which is a target to copy said pair volume in said switching table as said switching volume for a case that failure status which does not guarantee that pair status of said volume pair maintains consistency.

9. A computing system that identifies a volume thereof with an intra-host identifier (ID) and includes a storage device which is connected with said host computer through a communication line and identifies a volume with an intra-storage ID having a central processor device that sends a switching command which makes a correspondence between said intra-host ID of a switching source volume and identification information of a switching volume through an input/output (I/O) interface connected to said communication line, wherein said storage device has a port connected to said communication line, a channel adapter connected to said port, a shared memory being connected to said channel adapter and said port and storing volume pairs among which copy of volumes is executed, a disk adapter connected to said channel adapter and plural disk devices, being connected to said disk adapter, in which plural volumes are created, wherein said channel adapter receives a switching command that makes correspondence between said intra-host ID of a switching source volume and identification information of a switching target volume, searches over said shared memory said switching target volume which is identical to said switching target volume in reference to a switching target candidate volume which makes a relation of said volume pair with said switching source volume, memorizes said intra-host ID of said switching source volume and said intra-storage ID of searched said switching target volume both of which are corresponded and switches over to access said switching target volume after acquiring said intra-storage ID of said switching target volume in reference to said shared memory when said channel adapter receives an access command for which said intra-host ID of said switching source volume is set as a key, wherein said volume pair is a pair that executes copy from said switching source volume to said switching target volume, changes a pair status thereof to a pair status such that differential data cannot be received when said channel adapter is in a pair status such that differential data can be received from said switching source volume and waits until completion of changing to a pair status such that differential data cannot be received, wherein said channel adapter monitors said volume pair that executes copy from said switching source volume to a predetermined volume, memorizes predetermined volume in said shared memory as said switching target volume if a pair status of said volume pair is in a failure status to guarantee to maintain consistency and memorizes a volume which is a copy target of a predetermined volume in said shared memory as said switching target volume if a pair status is in a failure status not to guarantee to maintain consistency, wherein said shared memory controls volumes which are in a plurality of said storage devices and said switching source volume and said switching target volume are separately allocated in said storage device, wherein a data length of said intra-host ID is configured to be shorter than a data length of said intra-storage ID, and wherein identification information of said switching target volume is said intra-storage ID of said switching target volume, an ID of said storage device which has said switching target volume and suspend time specified to said volume pair of said switching volume.

10. A volume switching method that is executed by a computing system including a host computer which identifies a volume thereof with an intra-host identifier (ID) and a storage device which identifies a volume thereof with an intra-storage ID, wherein said storage device carries out steps comprising:

controlling, in a shared memory, a volume pair which executes copying between plural volumes, receiving, from said host computer, a switching command that makes a correspondence between said intra-host ID of said switching source volume and identification information of a switching target volume, searching over said shared memory said switching target volume which is identical to said switching target volume in reference to a switching target candidate volume which makes a relation of said volume pair with said switching source volume, memorizing said intra-host ID of said switching source volume and said intra-storage ID of searched said switching target volume, and switching over to access said switching target volume after acquiring said intra-storage ID of said switching target volume in reference to said shared memory when said storage device receives an access command for which said intra-host ID of said switching source volume is set as a key.

11. A volume switching method according to claim 10, wherein a data length of said intra-host ID is shorter than a data length of said intra-storage ID.

12. A volume switching method according to claim 10, wherein identification information of said switching target volume is said intra-storage ID of said switching target volume and an ID of said storage device that has said switching target volume.

13. A volume switching method according to claim 10, wherein identification information of said switching target volume is suspend time specified to said volume pair of said switching volume.

14. A host computer to be coupled to at least one of storage devices via a network, comprising:

a port to be coupled to said network; a processor coupled to said port; and a memory coupled to said processor;

wherein said memory holds an intra-host identifier (ID) identifies a volume and an intra-storage ID identifies a volume, wherein said processor generates a switching command which makes a correspondence between said intra-host ID of a switching source volume and identification information of a switching target volume through I/O interface connected to said communication line to said storage device which controls volume pairs which executes copy between plural volumes and sends to said storage device said switching command through said port, wherein said switching command makes said storage device:

search said switching target volume which is identical to identification information of said switching target volume among switching target candidate volumes which make a relation of said volume pair with said switching source volume, memorize, in a switching table, said intra-host ID of said switching source volume and said intra-storage ID of searched said switching target volume for which a correspondence is made, and switch over to access said switching target volume after acquiring said intra-storage ID of said switching target volume in reference to said switching table when said storage device receives an access request for which said intra-host ID of said switching source volume is set as a key.

15. A host computer according to claim 14, wherein a data length of said intra-host ID is shorter than a data length of said intra-storage ID.

16. A host computer according to claim 14, wherein identification information of said switching target volume is said intra-storage ID of said switching target volume and an ID of said storage device that has said switching target volume.

17. A host computer according to claim 14, wherein identification information of said switching target volume is suspend time specified to said volume pair of said switching target volume.

* * * * *